A. G. BOOZER, Jr. & G. HILL.
DOFFING MACHINE FOR SPINNING FRAMES.
APPLICATION FILED MAR. 16, 1909.
1,142,011.                                                     Patented June 8, 1915.
13 SHEETS—SHEET 4.
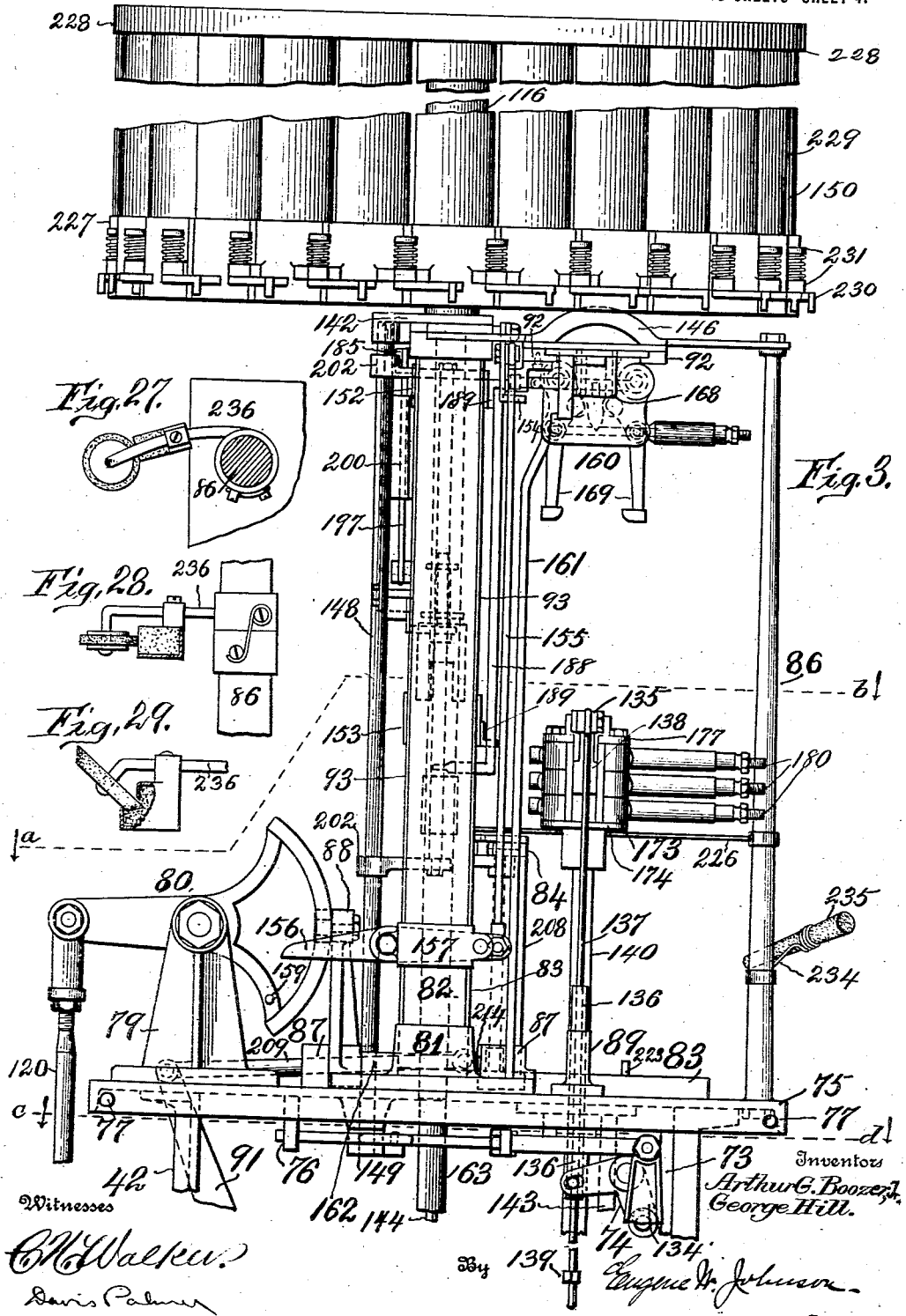

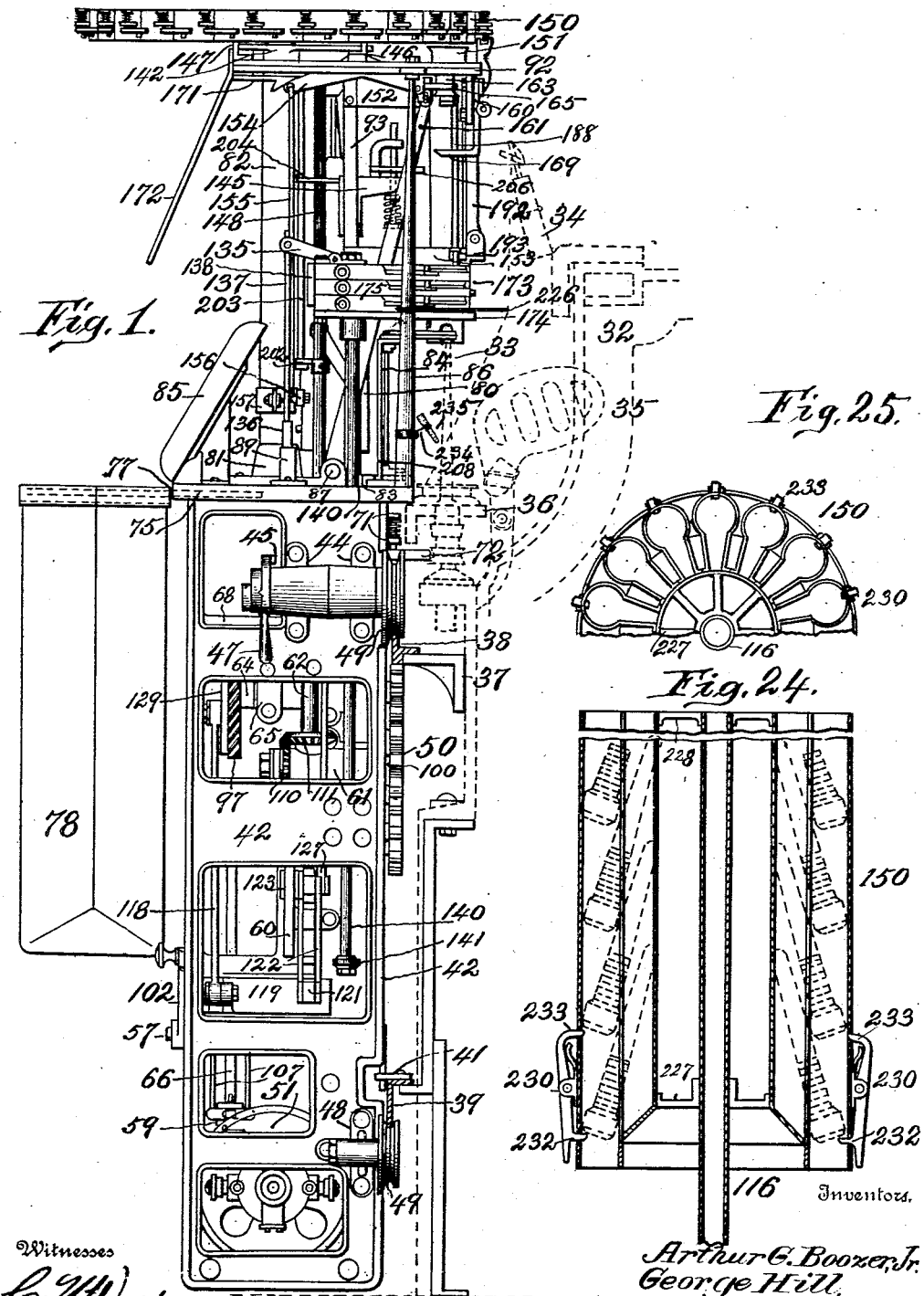

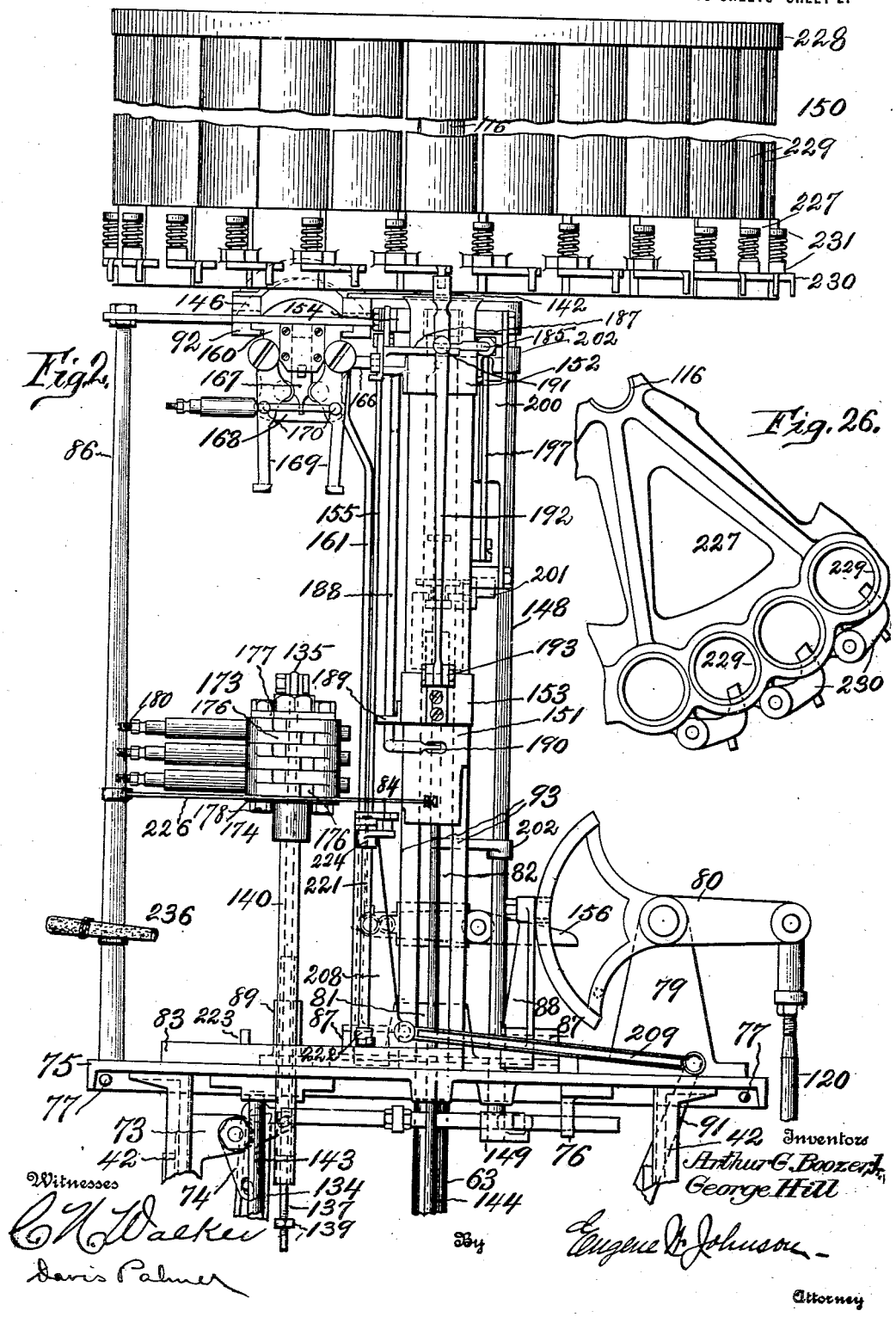

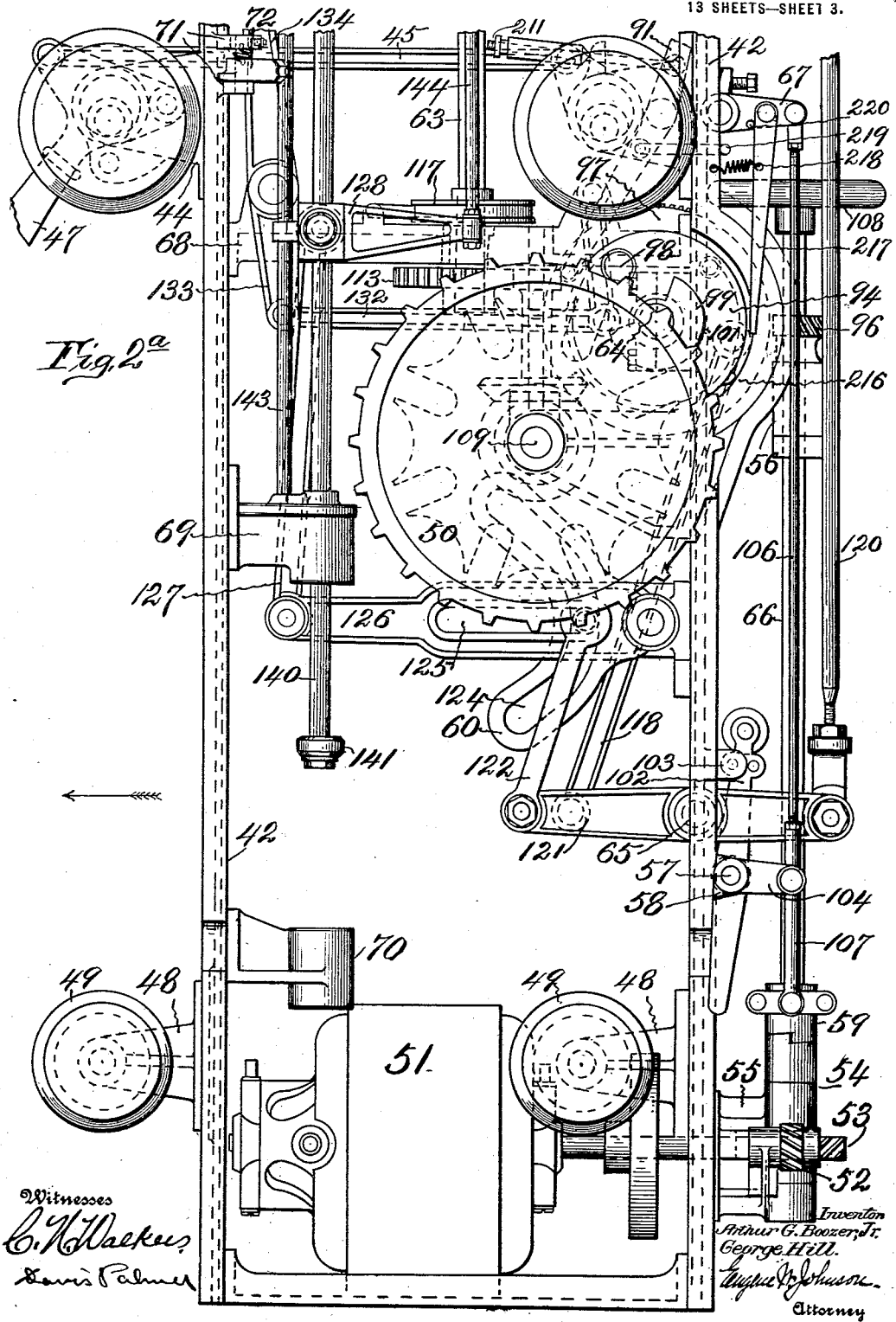

A. G. BOOZER, Jr. & G. HILL.
DOFFING MACHINE FOR SPINNING FRAMES.
APPLICATION FILED MAR. 16, 1909.
1,142,011. Patented June 8, 1915.
13 SHEETS—SHEET 5.
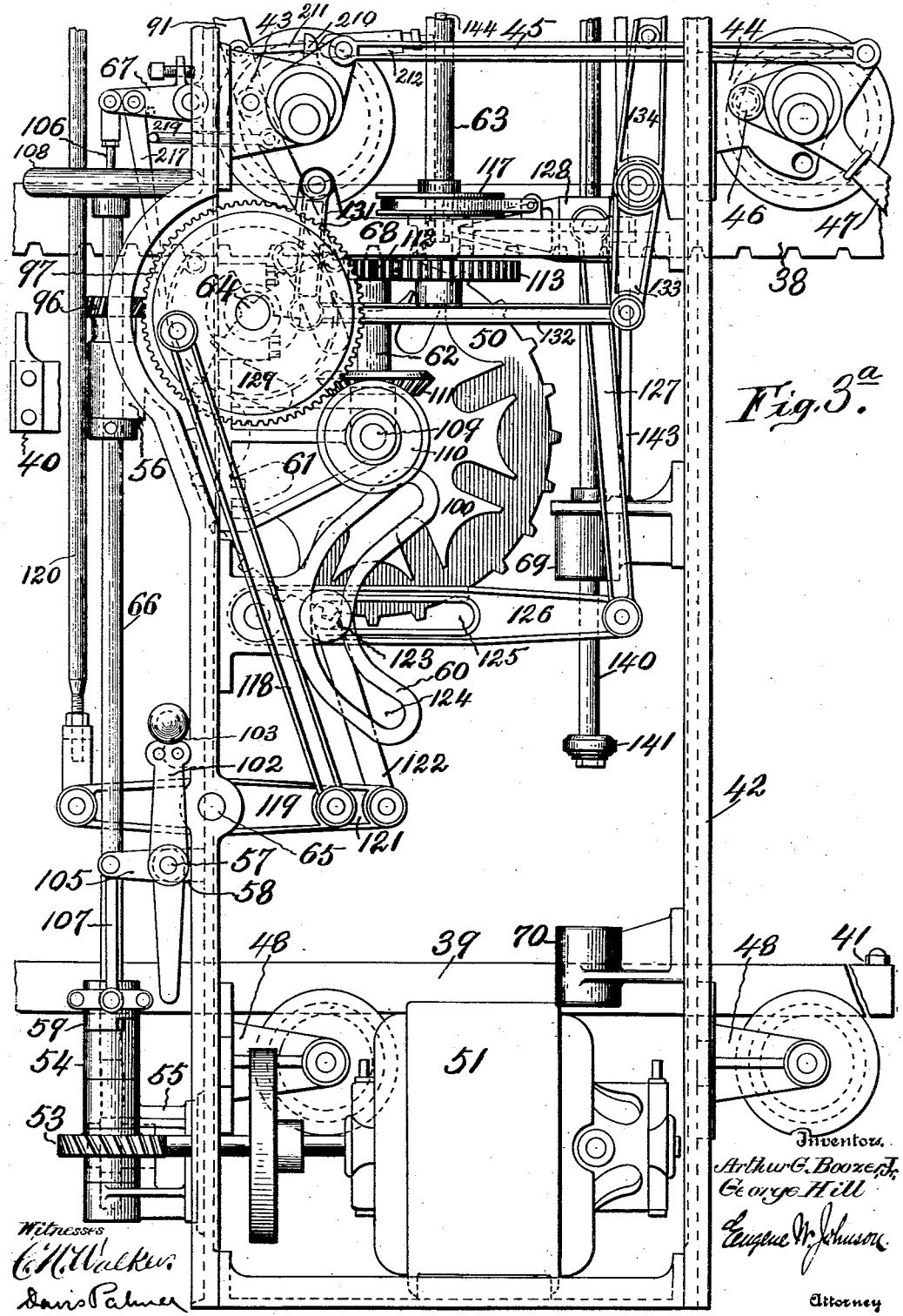

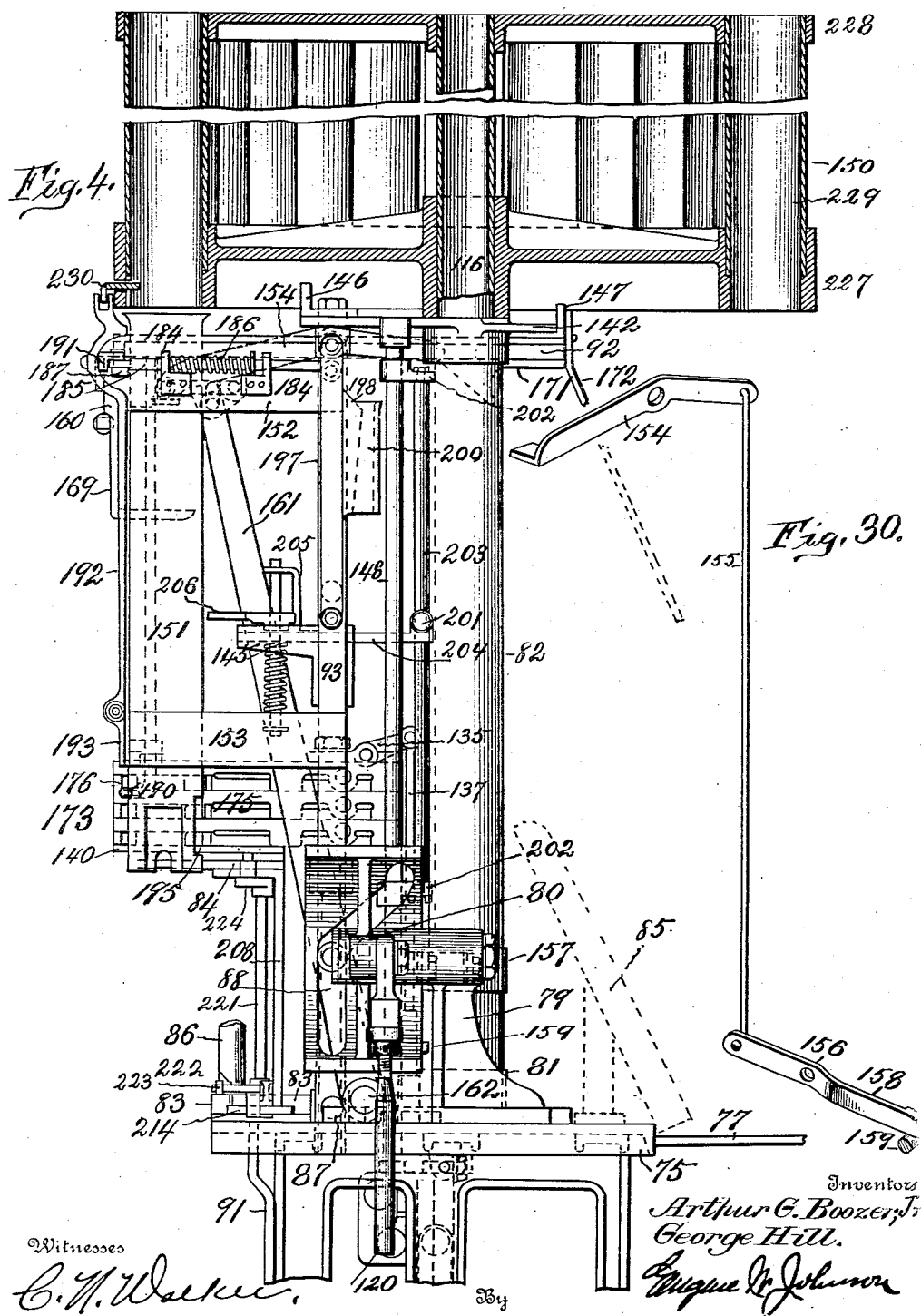

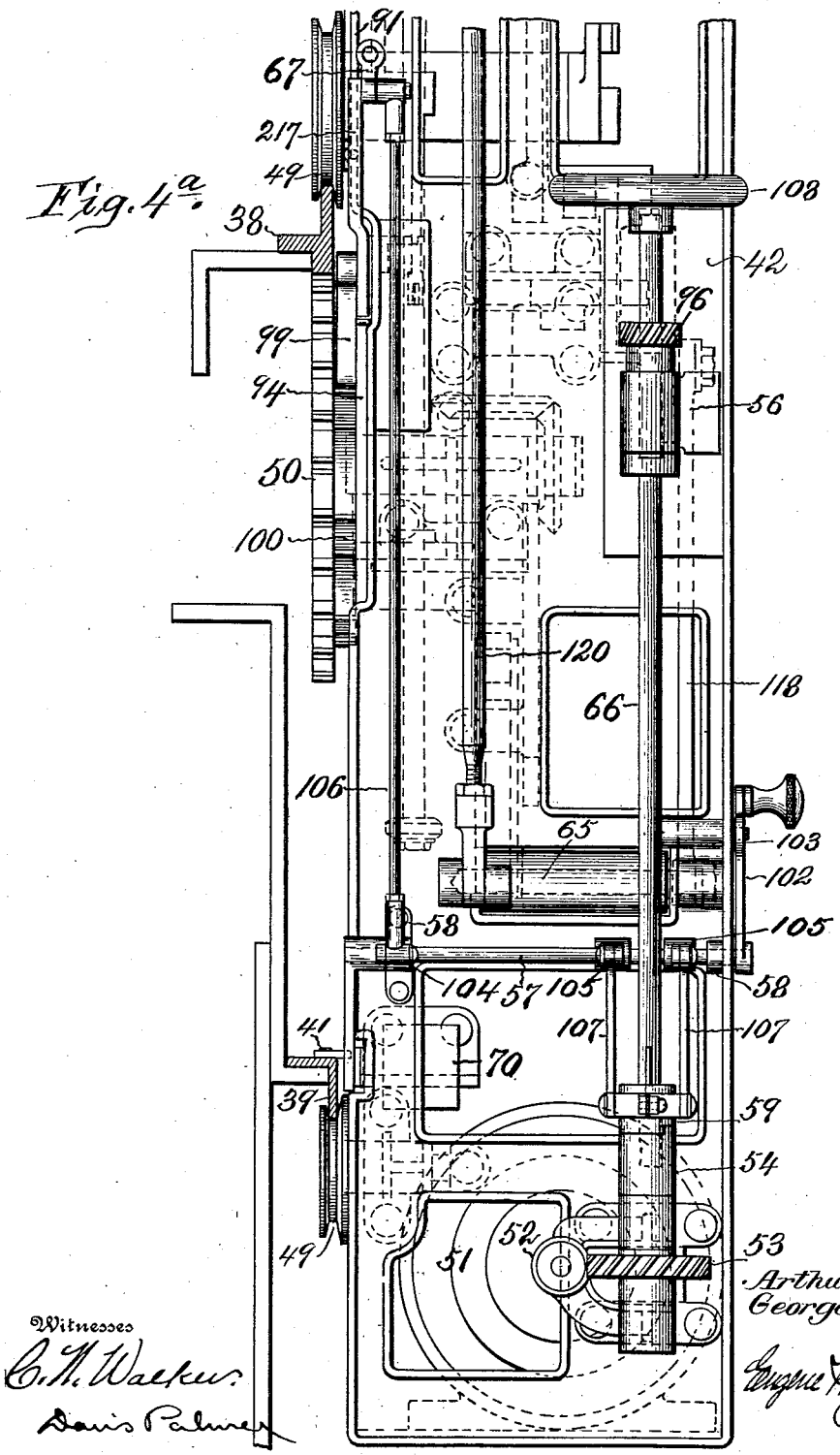

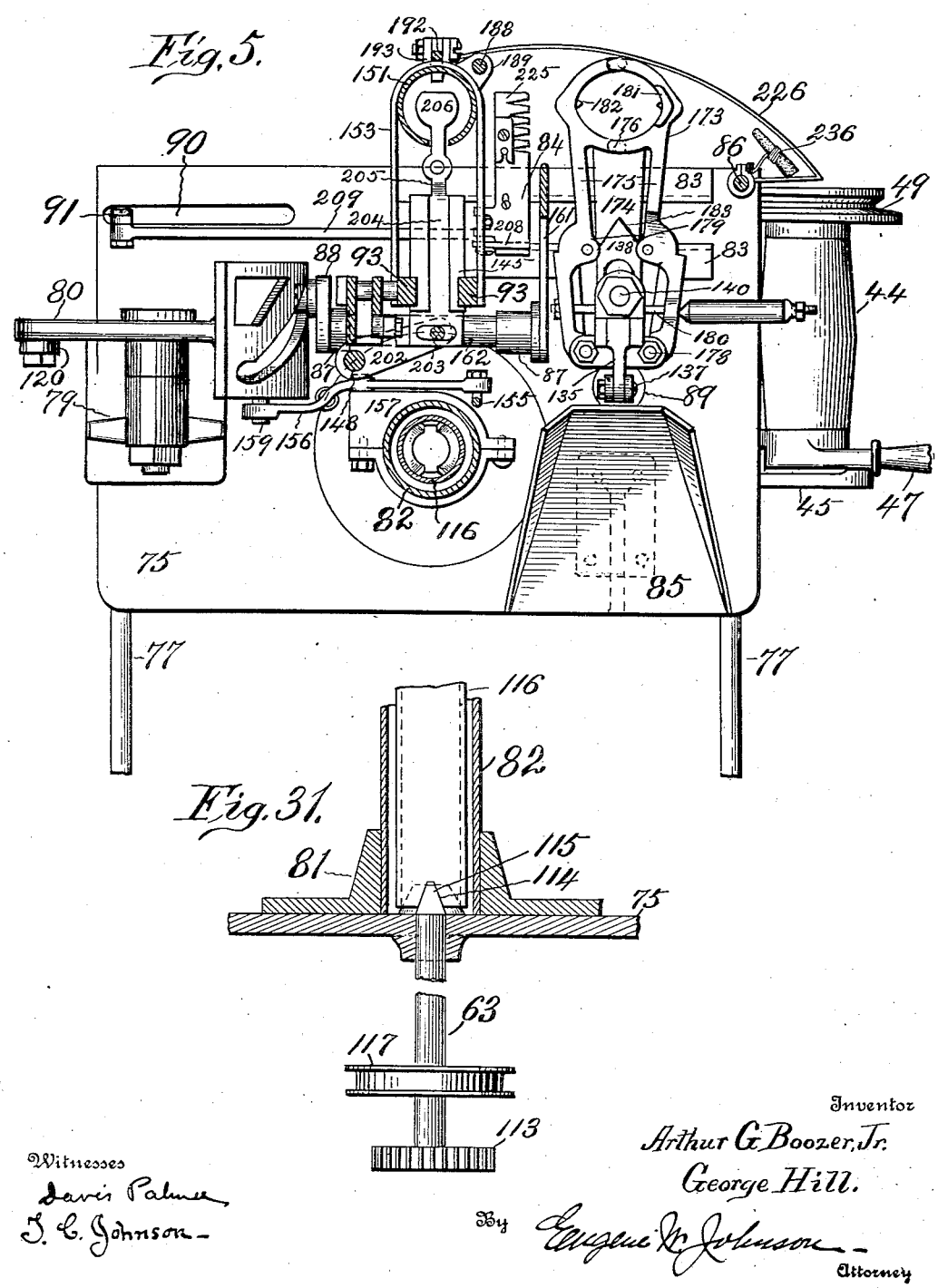

A. G. BOOZER, Jr. & G. HILL.
DOFFING MACHINE FOR SPINNING FRAMES.
APPLICATION FILED MAR. 16, 1909.
1,142,011.
Patented June 8, 1915.
13 SHEETS—SHEET 9.
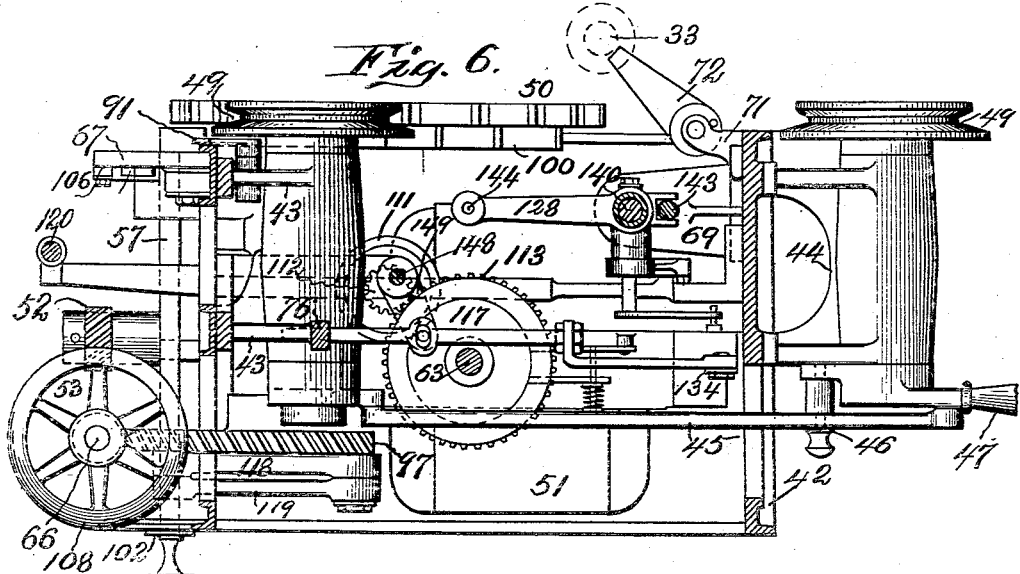

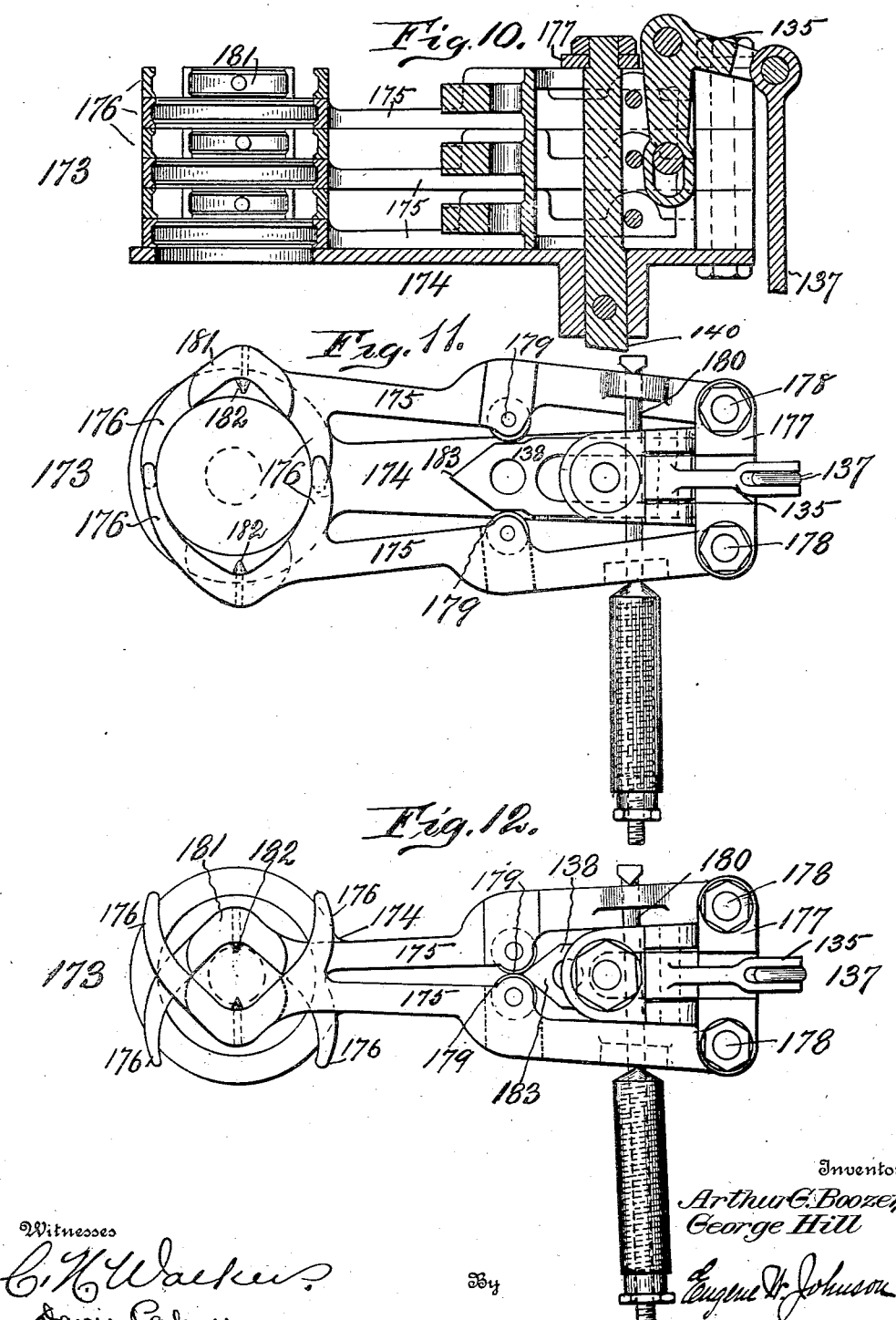

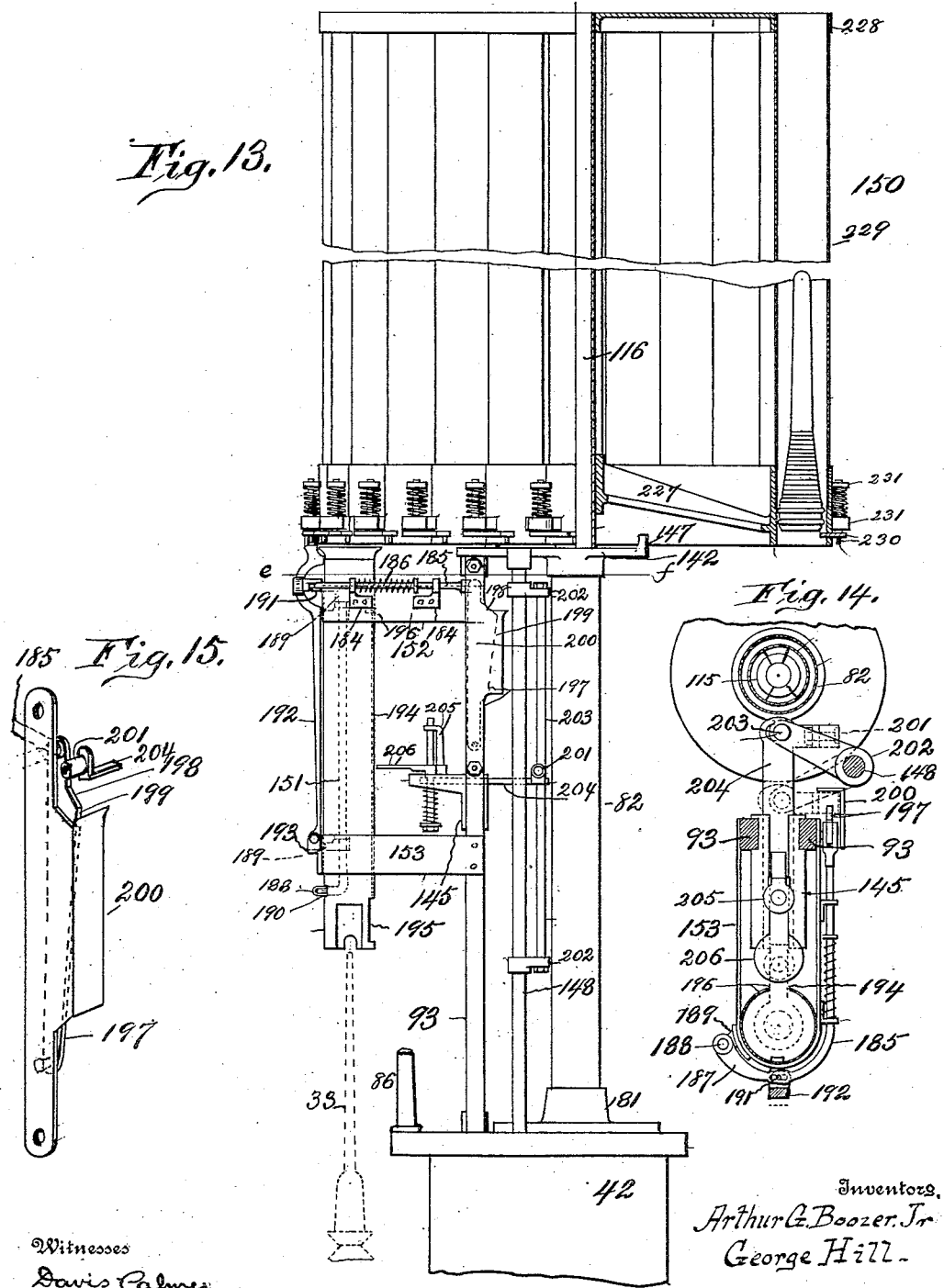

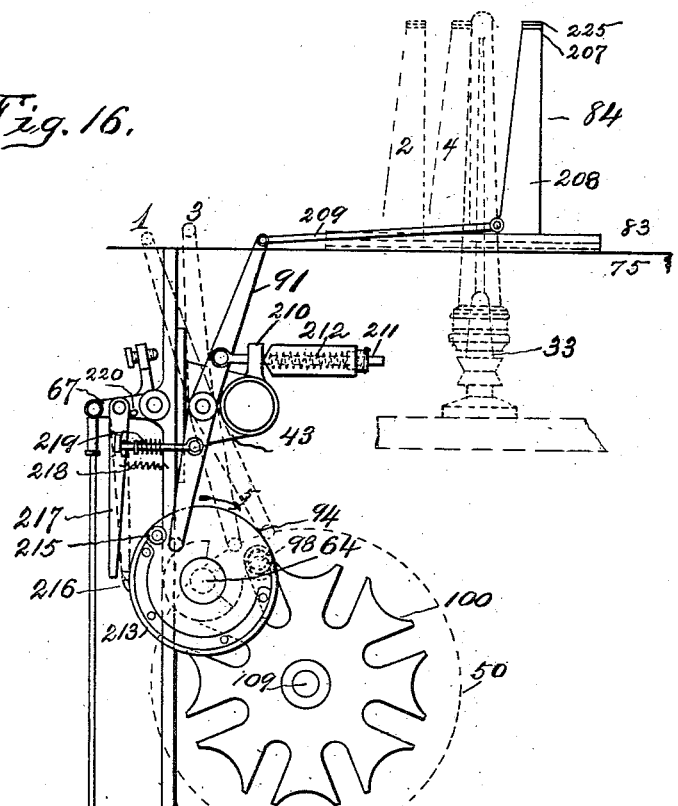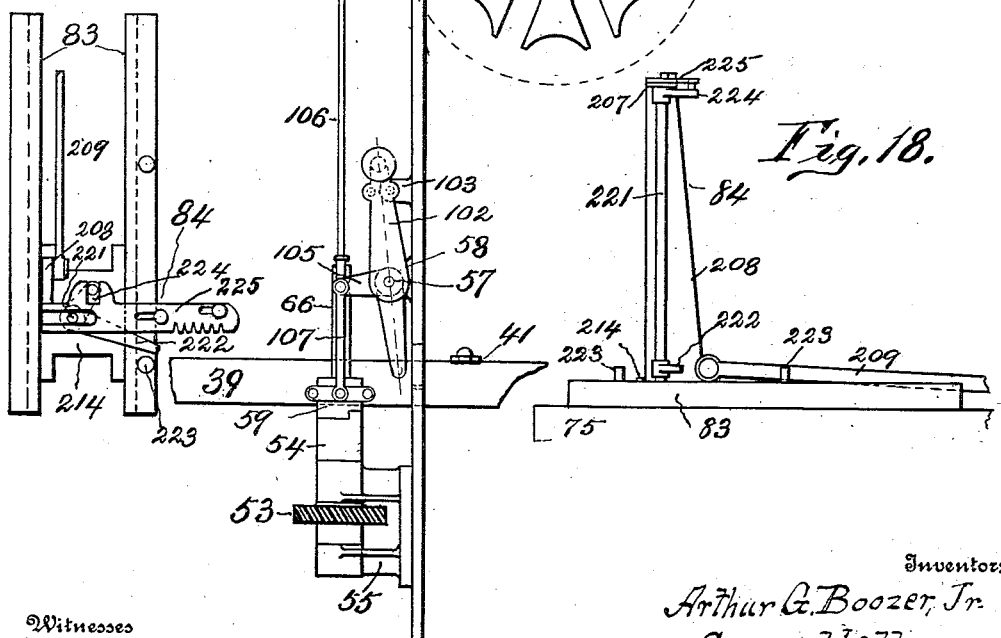

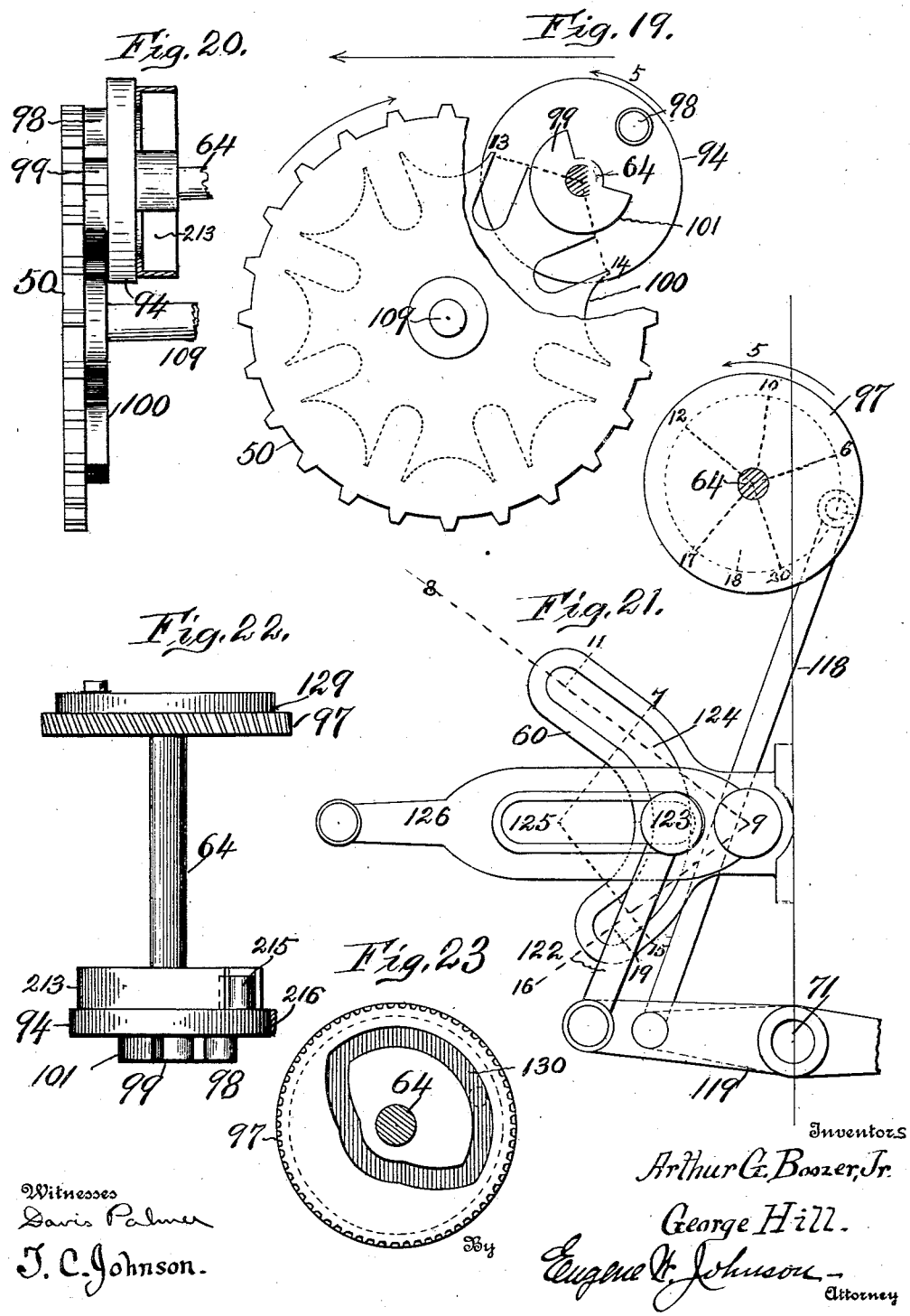

UNITED STATES PATENT OFFICE.

ARTHUR GEO. BOOZER, JR., AND GEORGE HILL, OF TUCAPAU, SOUTH CAROLINA, ASSIGNORS TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFING-MACHINE FOR SPINNING-FRAMES.

1,142,011.     Specification of Letters Patent.     Patented June 8, 1915.

Application filed March 16, 1909. Serial No. 483,821.

*To all whom it may concern:*

Be it known that we, ARTHUR GEORGE BOOZER, Jr., and GEORGE HILL, citizens of the United States, residing at Tucapau, in the county of Spartanburg and State of South Carolina, have invented certain new and useful Improvements in Doffing-Machines for Spinning-Frames, of which the following is a specification.

This invention has for its object to provide an automatic doffing machine for spinning frames, in which the several instrumentalities which make up the doffing mechanism coöperate to effectually remove a filled bobbin from a spindle and simultaneously place an empty bobbin upon an adjacent empty spindle, without injury to the thread or yarn on the filled bobbin, or injury to the spindles when removing therefrom a filled bobbin and when placing an empty bobbin thereon,—such doffing mechanism being removably attached to the spinning frame, the doffing frame having a motor for actuating a master shaft which intermittently drives a spacing gear that meshes with a rack on the spinning frame so that an intermittent travel of the doffer frame will be effected, during which the doffer instrumentalities will be so positioned as to pass the spindles, and during the periodic stoppages the doffing will be effected.

A doffing machine made in accord with this invention is designed to supersede doffing by hand, which is usually done by children, and in doffing by hand, before the spinning machine or frame is stopped the "doffer-hands" place in the alley or space between two spinning frames a truck that carries a receptacle which is divided; one part being for empty bobbins and the other part for full bobbins, which are placed therein as they are taken from the spindles. The spinning frame being stopped, the "ring-rail" is dropped to its lowest position, the "thread-board" and the "separators" are both pushed back to be out of the way. The "doffer-hand" removes a full bobbin from a spindle and then places an empty bobbin on the spindle from which the full bobbin has been removed. In taking off a full bobbin the slack end of the thread unwinds a little from the bobbin and winds around the spindle, the thread then being broken between the spindle and the filled bobbin, and in placing an empty bobbin on the spindle the thread will be gripped between the bobbin and the spindle. As the doffing proceeds the full bobbins are placed in the receptacle, and after all the full bobbins on a spinning frame have been removed and empty ones put in their places the builder motion is set, the "thread-boards" are lowered to working position, the "separators" are positioned between the spindles, which have thereon the empty bobbins, and the spinning machine is started.

In case threads of different numbers are being wound on different spinning frames in the same spinning room, the "doffer-hands" mark the bobbins before removing them from the spindles so that those of one number of thread may be readily distinguished from those of a different number.

Automatic doffing mechanism made to accord with the invention is applicable to spinning frames without changing the operative parts thereof, fixed guide and supporting rails for the doffing mechanism being attached to the spinning frame.

The doffing attachment is provided with a chalk holder or like means for marking the thread or yarn before the filled bobbins are removed from the spindles; there is present a guard wire or like means for moving the thread or yarn between the "thread-board" and the "traveler" out of the path of the machine and to prevent the thread being cut between the thread guide and the traveler. The doffer frame is provided with means for holding the spindle against upward movement when removing a filled bobbin therefrom; a deflector plate is carried by the doffer frame and is positioned thereon so that the filled bobbins may strike against it to fall either upon a chute or directly into a bag supported by the doffer frame.

The means for removing the filled bobbins from the spindles include a vertically reciprocating doffer-head which takes a filled bobbin from a spindle, carries the same upward to be engaged by a horizontally reciprocating bobbin carrier, operated so that upon completion of its forward movement it will release the bobbin, which drops into a bag carried by the doffer frame. In operative relation with the bobbin removing means there is a thread cutter that severs the thread or yarn, between the upper end of the spindle and below the bobbin, to leave the thread wrapped about the spindle as in hand doffing. In case of failure of the doffer head to remove a bobbin from its spindle such bobbin will arrest the movement of the support for the thread cutter, and by means of suitable mechanism the drive shaft will be placed out of gear with the motor, effecting an immediate stoppage of the doffing mechanism.

The means for placing an empty bobbin upon the spindle from which a filled bobbin has previously been removed, includes a source of supply for empty bobbins, the bobbins passing therefrom into a vertically maintained guide tube carried by the doffer frame, and when the guide tube is in line with an empty spindle a bobbin is released and drops over the spindle upon which it is pressed by a follower to insure proper engagement with the spindle and to hold the end of the thread or yarn between the bobbin and the spindle.

The parts of the doffing machine are synchronized so that the vertically movable bobbin removing and bobbin placing means execute their functions when the doffer frame is in fast engagement with the spinning frame, to avoid liability of lateral or sidewise strain upon the spindles, and by a construction in which the parts which engage the bobbins when on the spindles, have movements in line with their longitudinal axes, deflection or putting the spindles out of alinement is avoided.

In this description, where "spinning frame" is used it is intended to include, ring spinning machines, ring twisting machines and mule spinning machines, in fact all types of spinning machines in which bobbins are placed upon spindles, as well as silk spinning machines. Where the spindles are not maintained vertically the doffer frame is mounted on the spinning machine so that the doffing means will move in line with the longitudinal axis of the spindles.

The accompanying drawings illustrate one type of doffing or bobbin removing and bobbin placing mechanism, such type being applicable to ring spinning machines, and in these drawings the parts are shown in an intermediate position.

Figure 1, is an end elevation showing the doffing mechanism applied to a spinning frame, indicated by dotted lines, and in this view only the lower portion of the bobbin magazine is shown. Fig. 2, is a rear elevation of the upper portion of the machine, and Fig. 2ª, is a rear elevation of its lower portion. Fig. 3, is a front elevation of the upper part of the machine, and Fig. 3ª, is a similar view of the lower portion, the support and guide rails which are attached to the spinning frame being shown. Fig. 4, is an end elevation of the upper part of the machine viewed from the opposite end from Fig. 1, and Fig. 4ª, is a similar view of the lower portion. Fig. 5, is a horizontal section on the broken line $a-b$ on Fig. 3. Fig. 6, is a horizontal section taken immediately below the top of the table looking downward, on the line $c-d$, Fig. 3. Figs. 7, 8 and 9, are detail views of the means which carry the bobbins forward when delivered thereto by the doffer head. Fig. 10, is a vertical longitudinal section of the doffer head. Fig. 11, is a top plan view of the doffer head showing its jaws open. Fig. 12, is a top plan view of the doffer head with its jaws closed. Fig. 13, is an end elevation showing the bobbin supplying and bobbin placing mechanism, the magazine being partly in section. Fig. 14, is a section on the line $e-f$ of Fig. 13. Fig. 15, is a detail perspective view. Fig. 16, is a front elevation showing the thread cutter and stop mechanism which is actuated therefrom. Fig. 17, is a plan view of the thread cutter and its support. Fig. 18, is a rear elevation of a portion of the mechanism of the thread cutter. Fig. 19, is a rear elevation of the spacing gear and its operating means. Fig. 20, is a side elevation of the spacing wheel and its actuating mechanism on the master shaft. Fig. 21, is a diagrammatical view of part of the motion transmitting mechanism. Fig. 22, is a plan view of the master shaft and the gears carried thereby. Fig. 23, is a face view of one of the gears on the master shaft. Fig. 24, is a vertical section of a modified form of the bobbin carrier magazine. Fig. 25, is a plan view of a part of the bobbin carrier magazine shown by Fig. 24. Fig. 26, is a plan view of a portion of the bobbin carrier maganize, shown in Figs. 2, 3 and 4. Figs. 27, and 28 and 29 are views of different forms of chalk holders or bobbin markers from that shown by Fig. 3. Fig. 30, is a detail perspective view of a lever and connections, said lever actuating the means for opening the jaws of the horizontally movable bobbin carrier, and Fig. 31, is a vertical section showing the connection between the support for the bobbin carrying magazine and its drive shaft.

The spinning machine or frame 32, shown by dotted lines, Fig. 1, of the drawings is of usual construction, each front having spindles 33, thread guides 34, separators 35, and a ring rail 36, such parts being shown in position for doffing. Brackets 37, maintain a rail 38, and supports for an angle bar 39, are attached to the fronts of the spinning frame.

The upper rail 38, is made up to provide a track for the upper pair of wheels of the doffer frame, the under side of this rail being notched or provided with recesses which are spaced to accord with the teeth on the spacing wheel the distance between the spindles.

The upper rail 38, adjacent to one end has secured thereto an upwardly projecting stop piece 40, (Fig. 3ª,) against which one of the supporting wheels of the doffer frame may engage to serve as a guide in positioning the doffer frame upon the rails on the spinning frame prior to doffing.

The lower guide rail or way 39, is maintained so that a part depends from its support, the lower edge of the rail being engaged by the lower wheels of the doffer frame, and said lower rail 39, has near one end a horizontally projecting stop or pin 41, with which a trip-lever on the doffer frame may engage to stop the doffer frame or carriage at the end of its travel along the spinning frame, after the filled bobbins have been removed and empty bobbins placed upon the spindles, by disconnecting the drive shaft of the doffer frame from its motor.

The rails 38, and 39, and the supports therefor are the only fixtures which are attached to the spinning frame, and they are located so that they will not interfere with the moving parts thereof nor encroach materially upon the aisle space between the spinning frames.

The frame 42, that carries the doffing mechanism has brackets 43, and 44, each constructed to carry journals with eccentrically positioned stub shafts upon which are mounted the wheels that engage the rail 38. The front ends of the journals beyond the brackets have rigidly attached thereto crank-arms which are connected by a bar 45, and one of the crank-arms is formed on a part having a projecting member that carries a spring catch 46, for engagement with recesses in the front face of the bracket 44, that projects beyond the doffer frame, the catch holding the journals having the eccentric stub shafts upon which the wheels are mounted to hold the upper wheels either elevated or depressed when so positioned by moving the handle 47, carried by the part having the crank-arm and the spring catch.

Brackets 48, are attached to the lower portion of the frame 42, to carry stub-axles upon which are mounted wheels to engage the underside of the depending portion of the rail 39.

The supporting wheels of the doffer frame have circumferential grooves 49, and the front flanges are of greater diameter than the rear flanges, to facilitate the placing and removing of the doffer frame from the rails. By raising the handle 47, the doffer frame will be lowered sufficiently to place the teeth of the spacing wheel 50, below the rail 38, the rear flanges of the lower wheels then dropping below the plane of the lower edge of the rail 39; when the wheels are thus positioned the doffer frame may be removed from the spinning frame, by swinging the lower portion of the doffer frame outward and then lifting it free from the rails, this being done after doffing one side of a spinning frame, after which it is the practice to place the doffer frame on another spinning frame.

The means for lowering the spacing wheel 50, out of mesh with the rack, admits of the doffer frame being moved along the spinning frame by hand without operating the doffing mechanism, as well as providing a construction in which the doffing mechanism can be operated by hand and can be set to place the doffer head and bobbin placer in vertical alinement with the spindles.

The doffer frame and the bobbin removing and bobbin placing means are driven by a motor 51, which is secured upon the bottom of the doffer frame between its side pieces; the motor, preferably electric, is mounted so that its shaft will be in line with the direction of travel of the doffer frame, for by locating the motor low down and its shaft in line with the direction of travel, the doffer frame will be better balanced than if otherwise placed, vibrations are greatly reduced and the feed wires that supply the current to the electric motor are out of the way. The drive shaft of the motor 51, carries a spiral gear 52, which is held in engagement with a spiral gear 53, on a vertically maintained clutch section 54, that is supported by brackets 55, which project from one of the vertical sides of the doffer frame.

The doffers will be built right and left for application to the opposite fronts of the spinning frames, the drawings illustrating a machine built to travel from left to right or along a spinning frame in the direction indicated by the arrow.

The side of the doffer frame has attached thereto a projecting bracket 56, which is in line with the clutch section 54, such bracket forming the upper support for a vertical drive shaft upon which the sliding section of the clutch may move.

A shaft 57 is provided with arms 105 from which depend links 107 that engage a ring carried by the sliding section 59 of the clutch, and near the inner end of the shaft there is an arm 104 that projects in the same direction as the arms 105, and to this arm 104 is secured a rod 106 for rocking the shaft 57, to disengage the sliding section of the clutch from its driven section providing an automatic stop in case the doffing mechanism fails to remove a bobbin from the spindle. The shaft 57, may also be rocked by engagement of an arm on its inner end with the trip 41, on the lower rail 39.

Brackets 61, maintain the shaft of the spacing wheel 50, and provide bearings for a vertical shaft 62, said shaft carrying gears, the upper gear meshing with a gear on the lower end of a vertically maintained shaft 63.

The master shaft 64, is supported by pillow block bearings attached to the doffer frame, and on about a line with the upper rail 38, when the doffer frame is attached to the spinning frame. A cross piece 68, serves as an intermediate brace for the doffer frame and provides bearings or supports for parts which will be hereinafter set forth.

The doffer frame carries inwardly extending dash-pots 69 and 70; the upper dash-pot 69, serving as a guide for the doffer rod 140, which has at its lower end a piston that enters the dash-pots. In line with the whirls of the spindles of the spinning frame are lugs or supports 71, in which is pivoted a whirl engaging arm 72, said arm being moved rearward by a spring and having a stop for engagement with the doffer frame to limit the movement of the arm, and above the lugs 71, is a bracket 73, that carries a bell-crank 74.

The side bars of the doffer frame are attached to the under side of the table 75, the same having on its under side a depending guide 76, for one end of a horizontally reciprocating bar, the under side of the table also having vertical bearings for shafts and a slide that is reciprocated by the bell crank 74. Adjacent to its ends the table is provided with guideways or supports for rods 77, which may be pushed inward or projected, and when projected serve to carry a bag 78, into which the full bobbins fall after being doffed. The upper side of the table adjacent to one end maintains an upwardly extending bracket 79, which carries a lever 80, and forward of the center of the table is a support 81, for a hollow standard 82. Parallel guide rails 83, for a thread cutter 84, an inclined chute 85, a post 86, bearings 87, for a rock-shaft, which carries at one end an arm 88 and at its other end a bar or lever; and a guide 89, for the tube that is attached to the bell-crank 74, are also attached to the top of the table. The table has a slot or opening 90, for the passage therethrough of the upper end of a lever 91, which reciprocates the thread cutter.

In order that the doffer frame may pass the pin or stop 41, so that the arm which depends from the rock-shaft 57, may be tripped, the rear vertical members of the doffer frame are recessed in line with the pin, for in use the doffer frame travels beyond the stop to complete the doffing.

The hollow standard 82, into which the central depending tube of the magazine is passed supports horizontal guides 92, of the bobbin carrier, such guides being attached to vertical bars 93, and to a post 86, which extends upward from the table top.

The worm or spiral gear on the shaft of the motor 51, meshes with a gear 53, driving the clutch section 54, and upon the vertically maintained shaft 66, is mounted the slidable section 59, of the clutch, the shaft having a spline to hold the vertically movable section of the clutch in non-rotatable engagement with the shaft. When the shaft 66, is in rotatable engagement with the motor the gear 96 engages the toothed periphery of the gear 97, to turn the master shaft 64, which shaft has fast thereon a disk 94 (see Figs. 16 and 19,) having a roller 98, and a segment 99, and as the shaft is turned the roller enters radial slots in the star wheel 100, and imparts to the spacing wheel an intermittent rotary movement, and between each rotation of the segment its convex portion 101, is positioned between the radial slots to hold the spacing wheel 50, against rotation, providing a positive lock which will hold the doffer frame against movement upon the spinning frame. The movable section 59, of the clutch may be raised by an attendant to place the motor out of gear with the drive shaft 66, either by lifting the outwardly projecting arm of the bell-crank 67, or by moving the arm 102, that is carried by the shaft 57. Said shaft 57, has arms 104 and 105, the arm 104, being connected to the bell-crank 67, by a rod 106, and the members or arms 105, engage through the links 107, the encircling member attached to the sliding section 59, of the clutch. The arm 102, which is attached to one end of a transverse shaft 57 maintained by bearings 58, has below the knob that is attached to its upper end, spring catches to frictionally engage a plate 103 that projects from the frame, said plate 103, having therein a single recess. The spring catches coacting with the recess in the plate 103 hold the clutch section 59 in either its raised or lowered position.

To provide a convenient means for setting the spacing wheel and the doffing mechanism, the shaft 66, is provided at its upper end with a hand wheel 108, by which the shaft may be turned. The shaft 109, to which the spacing wheel 50, is attached, as well as the star wheel 100, has secured to its end opposite the star wheel a beveled gear 110, the same meshing with a similar gear 111, on the vertical shaft 62, bearings for said shaft being provided by the bracket 61, and the cross piece 68. The intermittently driven shaft 62, carries at its upper end a pinion 112, that meshes with the gear 113, on the vertical shaft 63, and through this shaft an intermittent rotary movement is imparted to the bobbin magazine.

The shaft 63, see Fig. 3ᵃ, and Fig. 31, has upon its upper end a conical clutch section 114, with inclined flanges 115, said flanges being engaged by the sides of the recesses formed in the lower end of the tubular shaft 130

116, attached to the bobbin carrying magazine. Above the cross piece 68, the shaft 63, has thereon a friction disk 117, about which is passed a band, one end thereof being secured to a lug that projects upward from the cross piece, and to the other end of the band is secured adjusting means, see Fig. 6, which may consist of a bolt, spring and nut.

The spacing gear and the bobbin magazine turn in unison, one bobbin chamber being brought above the feed tube and a spindle, as the spacing wheel has moved the doffer frame a space equal to the distance between the spindles.

To the front face of the gear 97, is attached the upper end of a bar 118, the lower end being connected to an arm 119, which projects inward from a rock-shaft 65, having other arms, as will be hereinafter set forth. The arm when moved by the bar 118, actuates the arm 121, and the arm on the other side of the rock-shaft to which the rod 120 is secured, said rod extending upward for engagement with one end of the lever 80, which is mounted on the support 79, such lever having a segmental face with a slot into which passes a stud on an arm 88, such arm operating through its shaft a lever or bar that reciprocates the horizontal bobbin carrier that will be hereinafter set forth.

The arm 121 of the rock-shaft 65, extends in the same direction as the arm 119, and to its outer end are secured bars or links 122, the upper ends carrying a roller or pin 123, which passes through a slot 124 in the guide plate 60, and through a straight slot 125 in an arm or bar 126, which is fulcrumed to the guide plate 60. The slot 124 of this guide plate is curved at its central portion and the end portions are straight, said end portions extending radially away from the pivotal center of the arm 126. The purpose of this construction, as will be more fully described hereinafter, is to regulate the movement of the doffer head which is raised and lowered by the arm 126, such arm being connected by the bar 127, to a cross head 128, which carries at one end a rod 144, attached at its upper end to a slide 145, which is maintained between the guides 93, the slide being reciprocated in unison with the doffer head.

The outer face of the gear 97, is formed with a forwardly projecting portion 129, such part reinforcing the gear as it is cut away to form a cam groove 130, in its inner face, (see Fig. 23,) in which travels a roller or stud maintained by the adjacent ends of the link 131, and the bar 132. The end of the bar 132 farthest from the stud is attached to the depending end 133 of a lever that is carried by the cross bar 68, the upper portion 134, of the lever having a pin or stud which engages an arm of the bell-crank 74, the other arm of said bell-crank being connected to a vertically movable tube 136, that passes through the hollow guide 89.

A rod 137, passes through the tube 136 and engages at its upper end the forward extending arm of a bell-crank 135, which is fulcrumed upon the doffer head, the depending member of said bell-crank being slotted to engage a pin on a slide 138, which when moved forward or projected, will open the jaws of the doffer head. The opening of the jaws of the doffer head takes place when the doffer head has reached the upward limit of its vertical movement, when a nut or stop 139, on the rod 137, engages the lower end of the tube 136, which has been depressed or lowered, thus pulling upon the rod 137, to lower the forward projecting arm of the bell-crank on the doffer head, which moves the slide 138, opens the jaws and releases a bobbin, which has been previously grasped by the horizontally movable bobbin carrier. The bell-crank 135, is moved in an opposite direction to permit the jaws of the doffer head to close upon a bobbin when the doffer head is lowered for when the doffer head reaches the limit of its downward movement the tube is raised to its highest position and engages either the upper end of the rod 137 or the arm of the bell-crank, which is lifted thereby to retract the slide 138. The lower end of the rod 137 may be passed through a suitable guide upon the cross head 128, and if desired a stop or nut may be carried by the rod to be engaged by the upper end of the tube. The doffer bar 140 is held against rotation by the cross head 128, the same having an apertured or recessed lug which engages a vertical bar or rod 143 attached at its lower end to the upper dash pot 69, and at its upper end to a bearing carried by the underside of the table top. Sudden stoppage or shock at the ends of the movements of the doffer head is avoided by providing the carrying bar 140 at its lower end with a piston head 141 that enters the dash pots to cushion the movement prior to complete stoppage of the doffer head, for the rapidity of the reciprocations and the character of the article carried by the doffer head renders the use of dash pots or other means acting just prior to complete stoppage of the doffer head necessary to avoid disarranging the thread or yarn on the bobbin, which would be liable to occur if a cushion at the end of the stroke was not provided.

The cross head has attached to its end a rod 144 which extends upward through the table top and engages a vertically reciprocating slide 145, (Fig. 4) which is maintained between the vertical guide bars 93, (see Fig. 2) said bars being attached at their lower ends to the table top and at their upper ends to a lateral extending portion on a frame which maintains a horizontally reciprocating bobbin carrier or auxiliary doffer.

The guides 93 are located in the rear of the hollow standard 82, and loops or straps extend from the guides and carry the guide tube 151 for the bobbins. The frame for the bobbin carrier or auxiliary doffer head comprises horizontal guides 92, which are connected at one end and at an intermediate point by bridge pieces 146 and 147, each having extensions that carry a plate 142 which is attached to the upper end of the hollow standard 82, and upon this part or plate the bobbin magazine 150 may rest when its tube 116 is passed through an opening therefor in said plate. The bridge pieces hereinbefore mentioned extend upward above the plane of the lower outer edge of the magazine, and the support 142 attached to the standard carries a depending bearing for the upper end of a rock shaft 148 which extends through the table and is provided below the table with a crank arm 149, the upwardly projecting pin thereon entering a transverse slot in a slide bar, one end thereof being maintained by the guide 76, its other being attached to a connection which is attached to the slide bar and to the upper end 134 of a lever, the same lever actuating the bell-crank 74 which moves the tube 136, which controls the opening and closing of the jaws of the doffer head.

The post 86 at its upper end is attached to an arm or plate that extends from one of the guides 92, said post materially bracing the frame of the horizontal bobbin carrier and also providing a support for a bar guard wire 226 used to keep the thread between the thread board and the traveler in the rear of the doffer head, and the post also provides a convenient means for carrying the marker or chalk holder.

The guide tube 151 (Fig. 4) is supported in a vertical position, being maintained in line with the bobbin chambers of the magazine, and with the spindles of the spinning frame by means of loops or straps 152 and 153, which are attached to the guide tube and to the uprights 93, and the straps 152 opposite one of the uprights has a stud or bearing for a lever 154, (Fig. 1) and the opposite side of said strap carries brackets or bearings for a rod that is moved in one direction by a plate which is pivoted to one of the uprights.

The lever 154 has a laterally extending end for moving the jaws of the auxiliary doffer head, and said lever is connected by a rod 155 (Fig. 1) to a rock-bar 156 that is fulcrumed upon a support 157 carried by the standard 82, the end portion of the rock-bar extending in the path of a stud or pin 159 that projects from one side of the lever 80, the parts being organized so that when the rod 120, attached to the lever 80 is lowered, the pin 159 will engage the under side of the rock-bar to depress its opposite end and lower one end of the lever 154, raising its other end so that the laterally projecting part will engage a roller on an arm carried by the reciprocating auxiliary doffer 160. The auxiliary doffer or bobbin carrier 160 is maintained in sliding engagement with the guides 92, and is reciprocated by a vertical bar or lever 161 carried by one end of a rock-shaft 162 which is mounted in bearings 87 on the table 75.

The arm 88 on the rock-shaft 162 has a pin which carries a roller that enters a slot formed through the segmental face of the lever 80, (Figs. 4 and 5) an intermediate portion of the slot being inclined to oscillate the bar 161, the vertical terminal portions of the slot allowing movement of the lever 80 without imparting movement to the bar 161, and when the roller is in the vertical end portions of the slot the bar 161 will be held against movement, such construction being for the purpose of holding the auxiliary doffer against reciprocation when the end of the lever 154 is moved to actuate a slide which when raised allows the bobbin grasping jaws of the auxiliary doffer to close upon a bobbin carried by the doffer head.

The auxiliary doffer head or bobbin carrier 160 (see Figs. 7 to 9) comprises a sliding frame which is maintained by the guide rails 92, said frame having a tubular part 163 that is flared at its lower end, and into this tube the tip or upper end of the bobbin will be placed by the doffer head. The horizontal portion of the frame to one side of the tube 163 has depending bifurcated lugs 160ᵃ which are vertically slotted to receive a pin at the upper end of the bar 161. The slide is also provided with bearings 164 between which a rocker frame 165 is maintained by a crank arm 166, the end beyond the supporting frame having a roller. The rocker frame 165 has on its end which is opposite the part through which the crank arm passes a projection for engagement with a vertically reciprocating slide 167 which is tapered at its lower end, the same being carried by a suitable guide attached to a vertical plate 168, that depends from the horizontal plate which carries the tubular part 163.

The plate 168 has secured thereto bobbin carrying jaws 169, the parts that engage with the bobbin being bent at right angles to extend below the tubular portion of the slide, and the jaws are drawn toward each other by an incased spring mounted upon a rod carried by studs 170, which pass through slots in the plate 168. The jaws may be provided with antifriction rollers which impinge against the slide 167. A depression of the roller on the end of the crank arm 166 effects a depression of the slide 167, to separate the bobbin engaging members, and when the roller is raised the slide will be retracted and the bobbin engaging members will be moved toward each other by the spring.

To the forward end of one of the guides 92, to be in line with the roller attached to the end of the crank arm is a fixture 171 (see Figs. 1 and 4) that has an inclined face against which the roller will abut to open the bobbin carrying jaws when the carrier to which they are attached reaches the limit of its forward movement to release the bobbin carried thereby, and to prevent the bobbin being thrown forward by its momentum a deflector plate 172 is attached to the slide carrying frame, to direct the bobbins either onto the chute 85 or into the bag 78. The frame 146 is arched so that there will be no liability of the upper ends of the bobbins engaging therewith in case such ends should project beyond the upper surface of the slide.

The doffer head 173 comprises a base plate or supporting frame 174 which is attached to the doffer bar 140, the base being constructed to provide at one end an opening of such size that a filled bobbin may pass therethrough. The part about the opening serves as a rest for the lower jaws of the bobbin grasping member and this part by pressing the thread on a bobbin to one side will prevent the same becoming entangled with the jaws, when the doffer head is lowered over a filled bobbin. The end of the base plate has lateral extensions through which pass bolts which carry the end portions of the arms 175 upon which are formed the bobbin engaging fingers 176. The upper end of the doffer rod 140 has attached thereto a plate 177 having bearings for the bell crank 135 and lateral extensions through which pass the bolts 178. The arms 175 each at an intermediate point carry rollers 179 and between the rollers and the apertures through which pass the bolts 178, the arms have apertured lugs through which pass rods 180, the projecting ends of the rods having mounted thereon springs which are incased by suitable housings, adjusting nuts being carried by the rods so that the tension of the springs may be varied. The grasping members 176 of the arms are shaped to provide fingers positioned so that those on one arm will overlie those on the opposite arm, and each bobbin engaging member has formed thereon a part 181 which may have a stud or projection 182 such parts being shaped to engage an empty bobbin, when the jaws are positioned as shown by Fig. 12 of the drawings. The slide 138 carries a number of projecting wedge shaped ends 183 which press the rollers apart to spread the arms and position the fingers in line with the inner wall of the opening through the plate, and when the slide is projected as shown by Fig. 11 the arms will be held separated, the rollers then engaging the straight sides of the slide. It will be noted that the inner faces of the grasping members of the doffer head are recessed or concave, to give a better grasp upon the thread or yarn upon a bobbin. A plurality of independently acting grasping members will prevent the doffer head slipping upon the yarn or thread and means are provided whereby the pressure of the grasping members will be distributed to effectively grasp a filled bobbin without injury to the thread thereon, and by means of the construction shown, it is immaterial whether the bobbins are wound regularly or irregularly, or are only partially filled, as each pair of grasping members acts independently.

The inner faces of the overlapping fingers are shaped so that the end portions, when the jaws are open will be in line with the inner wall of the opening through the base plate, and beyond such segmental portion the bobbin engaging portions converge, as shown.

In use the two upper grasping fingers may have their springs adjusted to exert a pressure upon the thread on the bobbin which will be less than the pressure exerted by the lower fingers, which will prevent the yarn being displaced by the pull of the jaws upon the filled bobbin. It will also be noted that each pair of grasping members are on different horizontal planes, and though each pair of grasping fingers are independent in grasping a bobbin, they are all opened simultaneously to release a bobbin.

The vertically maintained guide tube 151, into which the empty bobbins drop from the magazine, is flared or extended outward at its upper end, and the support or strap 152, which maintains the upper end of the guide tube and is attached to the vertical bars 93, has fastened thereto brackets 184 which maintain in sliding engagement therewith a slide bar 185, (see Figs. 13 and 14) provided with a collar against one end of which a spring 186 will abut, the other end contacting with one of the brackets. The slide bar 185 is curved to extend about the guide tube 151 and has a slot through its end portion which overlies a slotted end portion of an arm 187, (Fig. 2) carried by the upper end of a rock bar 188, which is maintained in a vertical position parallel with the guide tube by bearings 189 attached to the supports or straps 152 and 153. The lower portion of the rock bar extends in the same general direction as the arm 187, and its end is bent inward so that it may pass through an opening 190 in the rear wall between the strap 153 and the lower end of the guide tube. The adjacent ends of the arm 187 and the slide bar 185 are connected by a suitable shackle 191, (Figs. 2 and 4) carried by a lever 192 that is fulcrumed upon a fixture 193 on the rear side of the support or strap 153. The bifurcated or projecting upper end of the lever 192 engages at intervals with pins to actuate movable bobbin releasing means on the magazine or bobbin carrier, to release therefrom an empty bobbin that passes into the guide tube, and at the same time a bobbin which has previously been deposited in the guide tube, is released by the withdrawal of the lower end of the rock bar from the guide tube.

The lower end of the guide tube 151 extends downward to be a short distance above the plane of the upper ends of the spindles of the spinning frame, and on one side it is cut away to clear any spindles which may extend above the usual height, while the end of the tube is cut away opposite to the smaller recess sufficiently to admit of the passage of the upper end of the bobbin through such open ended slot when upon the spindle, and the tube is also provided through its front wall with a vertical slot 194, (Figs. 13 and 14) which intersects horizontal openings 195 and 196 opposite the limit of the movements of a presser plate that is moved into the guide tube after a bobbin has been deposited therein, the presser plate following the bobbin downward and pressing the same upon a spindle, after which the guide tube is moved with the doffer frame beyond the bobbin, the upper end of the bobbin then passing through the larger open ended slot in the guide tube.

The slide bar or rod 185 is attached at its forward end to the upper end of a plate 197, (Fig. 15) which is pivoted at its lower end to one of the vertical bars 93, said plate having at its front inclined edges 198 and 199, the lower inclined portion being overlaid by the vertical edge of a fixed plate 200 carried by the bar 93. The forwardly extending portion of the plate 200 is opposite the longer inclined portion 199 of the pivoted plate 197, and its upper end is extended toward the front to guide an actuating roller 201 between the vertical edge of the fixed plate and the inclined portion of the pivoted plate to move the slide bar 185 against the action of its spring.

The vertical rock shaft 148 has arms 202 which support a guide bar 203, which is engaged by a horizontally reciprocating slide bar 204, the same being transversely slotted at the point of engagement so as not to bind upon the bar 203. The slide 204 has a laterally extending portion that carries the roller 201, and said slide which reciprocates in ways formed in the vertically movable slide 145 maintained between the vertical guide bars 93, has an upright 205, and in line with its apertured rearwardly extending upper end is an opening for the passage of the rod to which is secured the presser plate 206. The presser plate 206 is normally held against the slide 204 by a spring, and when the slide 145 is moved upward by the rod 144, and reaches a point where the presser plate will be opposite the opening 196 through the guide tube, the shaft 148 will be rocked to bring the roller above the upper inclined portion of the pivoted plate 197, and at the same time the slide carrying the presser plate is moved into the guide tube, above the upper end of a bobbin supported therein by the lower end of the rock bar 188. The roller by engagement with the pivoted plate moves the slide bar 185 against the action of its spring and pushes the upper end of the lever 192 rearward to move one of the catches of the bobbin magazine releasing a bobbin which drops into the guide tube upon the presser plate, and as the slide 145 is lowered the roller will bear upon the upper inclined portion of the plate 197, moving the rock bar 188 so that its lower end is withdrawn from the guide tube and the bobbin sustained thereby will be dropped upon the spindle and is pressed thereon by the presser plate 206 which is withdrawn through the elongated opening 195 by the reverse movement of the rock shaft 148. Before the presser plate is withdrawn from the guide tube the roller will have been moved below the longer inclined portion of the pivoted plate so that the upper end of the lever will be brought in line with the depending portion of the next bobbin catch of the magazine, and the end of the rock bar 188 will enter the guide tube to engage the bobbin now on the upper face of the presser plate.

The thread cutter 84 (see Figs. 2 and 16 to 18) is carried by a standard or upright 208 which projects upwardly from a slide 214, which has a reciprocal movement between the guide rails 83, the slide being actuated by a rod 209, one end thereof being attached to the slide, the other end engaging the end of the lever 91 that extends through the slot 90 in the table top. The lever is fulcrumed upon a bracket 43, the same being provided above the fulcrum of the lever with an upward extending lug 210, which has an opening therethrough for the passage of a rod 211 attached to the lever 91, and provided with an incased spring 212, the tendency of the spring being to move the lever toward the lug. The lower end of the lever 91 is provided with a roller for engagement with a flange 213 that projects from a disk 94 on the master shaft 64, such disk having a stud that carries a roller 215 for engagement with the lever 91 when the disk is turned to move the lever against the pull exerted by the spring upon the rod 211.

The disk 94 is provided on its periphery with a detent or catch 216 for engagement with the lower end of an arm or pawl 217, that is pivoted to depend from the outwardly projecting member of the bell crank 67. The pawl 217 is drawn toward the disk 94 by a spring 218, and it is moved beyond or out of the path of the detent by a push bar 219, attached to the lever 91 below its fulcrum, when the slide 214 that carries the standard 208 makes its full travel from one to the other side of a spindle on the spinning frame. Movement of the arm or pawl 217 inward is limited by a stop pin 220, and if desired the push bar 219 may be provided with a collar and with a spring that encircles the push bar and abuts against the collar and the frame.

The outer end of the arm of the bell crank 67 has secured thereto the upper end of the rod 106, the lower end thereof being attached to the arm 104 (Fig. 2ª) that projects from the shaft 57, which is connected by the arms 105 to the links 107, whereby the sliding member 59 of the clutch 54 may be raised to place the motor out of gear with the drive shaft when the movement of the slide is arrested by reason of the upright or standard 208 engaging with a bobbin on a spindle, the clutch being operated only in case of failure of the doffer head to remove a bobbin from a spindle.

The upper end of the standard or upright 208 is bent at right angles to overlie the upper end of the spindles, and this horizontal portion provides a bearing for the upper end of a vertical shaft 221, (Figs. 17 and 18) the lower end of the shaft being seated in the slide 214. Above one of the guide rails 83 the shaft 221 has fast thereon a horizontal arm 222 that overlies the guide rail to engage with the upward projecting pins 223 fixed in said rail, whereby the shaft will be rocked. An arm 224 also fixed in the shaft 221 has an upwardly projecting pin on the end of said arm, said pin operating in a slot in a plate 225 which constitutes the reciprocal blade of the thread cutter 84. The horizontal projecting portion of the standard is serrated to form the fixed member 207 of the cutter bar, and the reciprocal member 225 has therethrough a slot in line with the upper end of the rock shaft 221, and slots for the passage therethrough of guide and attaching pins. The construction shown provides means whereby when the slide that carries the standard and thread cutter is moved in one direction, the movable blade will be placed so that the teeth thereon will overlie the teeth of the fixed member, and the movable blade will be actuated after the thread cutter has been passed beyond the spindle. The construction shown provides positive means for actuating the thread cutter, thus dispensing with springs, and permits the blades to be slidably secured one upon the other in close contact. The ends of the knives or blades may be flat so that they will not injure a bobbin in case of contact therewith.

The movements of the lever and the standard are shown by the dotted lines on Fig. 16 of the drawings, 1 and 2 indicating the position of the lever and the standard when the end of the lever bears against the face of the flange 213; 3 and 4 indicate the positions when movement of the standard is restrained by engagement with the upper end of a bobbin, which should have been removed from the spindle, and in such case the arm or pawl 217 being in the path of the detent 216, will be raised to lift the bell crank lever, disconnecting the drive shaft from the motor, thus providing an automatic stop for the doffing mechanism which is operated in case of failure of the doffer head to remove a bobbin from the spindle. In such a case the bobbin may be removed manually, when the doffer will again proceed in its operation. The full lines show the lever and standard in position to sever the thread between the upper end of the spindle and below the lower end of a filled bobbin which has just been removed from the spindle by the doffer head.

The rotation of the master shaft 64 in the direction indicated by the arrow, will carry the lever to the position shown by dotted lines 1, said lever then riding upon the flange 213, and when the end of the flange passes the lever, said lever will be moved by the spring 212 across the open space between the ends of the flange, bringing the lever and standard to the position indicated by full lines. When the movement of the standard is limited by engagement with a bobbin on a spindle, the lever 91 will be held as shown by dotted lines 3, the pawl 217 being against the flange and above the detent to be engaged thereby so as to lift the bell crank and sliding section of the clutch, for the purpose hereinbefore set forth. When the movement of the lever 91 is not restrained, by engagement with a bobbin, the master shaft will have turned to locate the detent above the end of the pawl, and further rotation of the shaft will carry the end of the lever across the space between the ends of the flange 213, the lower end of the lever riding upon the roller 215 until it again engages the flange.

In order to avoid any possibility of the thread engaging with the doffer head or being caught between the thread board and the traveler, particularly when the traveler is positioned to the front of the traveler-ring, there is provided a guard wire 226 (Figs. 2 and 5) which is attached to the post 86 and to the guide tube 151, its forward end being well within the line of travel of the rear edge of the table top, so that the guard wire will push the thread backward and out of the way. The guard wire is above the plane of the upper ends of the spindles and is well out of the way of the separators.

The bobbin magazine 150 as shown in this application, comprises a tubular centrally located shaft or support 116, to which circular frames 227 and 228 are attached, the frames each being provided with arms that project from the hubs to maintain apertured rims for the reception of the bobbin carrying tubes 229, preferably of paper or other light material. The arms of the lower frame 227 extend downward and outward so that there will be considerable space below and adjacent to the hub in order to provide a clearance space for the supports of the horizontally movable bobbin carrier. The upper portions of the apertures in the lower frame 227 are enlarged by about the thickness of the tubes 229, and the outer walls have therethrough openings for the passage of the bobbin supporting ends of the catches 230, catch supports 231 being integral with the lower frame, each catch having a spring for moving its bobbin supporting end inward, to engage the larger end of the lower bobbin in the tube 229. The catches each have depending portions which are successively engaged by the upper end of the lever 192 to move the catches outward or against the movement imparted thereto by the springs. The bobbin carrying tubes 229 may be of sufficient length to receive three or four bobbins in each tube, a magazine carrying sufficient bobbins to supply one side of a spinning frame, and by means of the gear on shaft 63 an intermittent rotary motion is imparted to the magazine, as hereinbefore described. The construction shown provides a magazine which can be readily removed for placing empty bobbins therein.

In place of a magazine constructed as shown by Figs. 2, 3, 4, 13 and 26, one constructed as shown in Figs. 24 and 25 may be used, the same having a series of vertical chambers which are divided by vertical walls spaced to permit the passage of the upper portions of the bobbins between the walls, and in such a magazine the bobbins will be maintained in an inclined position. A magazine thus constructed is particularly intended to be used with that type of bobbins which have in their lower ends openings of greater diameter than their upper ends, for such bobbins when placed in line one above the other are liable to stick together. The catches shown in Fig. 24 have on each side of their support inwardly extending members, 232 and 233, the lower member being moved inward by a spring to engage the lower portion of a bobbin, and the distance between the bobbin engaging parts is such that when the part 232 is moved outward to release the lower bobbin which drops into the guide tube 151, the upper inward projecting portion will be moved inward to engage and hold the bobbin above the one just released in the magazine until the catch is moved beyond the catch actuating means. Both types of magazines are interchangeable, one or the other being supplied according to the make of bobbin used upon the spindles. When it is not desired to use a bobbin magazine which is carried by the doffer-frame, the bobbin may be supplied to the guide tube by other means, as will be fully set forth and claimed in another application, Serial No. 485,001.

The means for marking the bobbins preferably comprises a resilient arm 234 made up to carry at one end a crayon 235. The arm is attached to the post 86 and holds the crayon so as to press upon a filled bobbin, and will mark such bobbin as the doffer frame is moved along the spinning frame. Different forms of the marker are shown by Figs. 27, 28 and 29. Figs. 27 and 28 show a support or arm 236 attached to the post by means of a movable collar which may turn thereon, the same being spring actuated in one direction. The outer end of the arm has mounted thereon a disk which will contact with chalk held by a suitable carrier attached to the arm. Fig. 29 shows the arm 236 provided with a suitable receptacle for pulverized chalk, as well as a marking disk which is maintained at an inclination. The bobbin marking device is intended to be used more particularly when yarn or thread of different numbers is being spun by different spinning frames located in the same spinning room.

Referring to diagram Fig. 21 for a better understanding of the movement of the doffer rod, it will be noted that the master shaft 64 is turned in the direction indicated by the arrow 5. The doffer rod is attached to a rod which is actuated by the arm 126. When the pin which connects the rod 118 to the projecting portion 129 of the gear 97 is carried by the rotation of the master shaft to a point indicated by the dotted line 6, the stud 123 will be at a point indicated by the dotted line 7 in the guide slot 124, such slot being formed through the guide plate 60. The stud 123 is then at the commencement of the straight upper portion of the slot through the guide plate, and when the parts are so positioned, the slots through the lever or arm will be in line with the radial slot through the guide plate, the dotted lines 8 and 9 indicating the position of the lever. When the end of the connecting bar arrives at the point 10, the stud will be brought to point 11, and further travel carries the end of the bar 118 to a point 12, and the stud 123 back to the point 7. The motion of the gear on the shaft 64 from points 6 to 12 equals one third of a revolution, and while the end of the connecting rod 118 is moving from 6 to 12 the straight slots are in alinement and the stud 123 will hold the lever 126, and the bar connected to the doffer head in their highest positions and while so held the doffer frame is moved along the spinning frame a space equal to the distance between adjacent spindles. While the pin on the end of the bar is traveling from 6 to 12 the pin 98, (see Fig. 19) is traveling from 13 to 14, the cut away portion of the segment 99 being opposite the concave end of a tooth so that the pin will move the star wheel one space, the spacing wheel being turned to move the entire doffing machine along the spinning frame for a distance equal to the space between adjacent spindles, and after such movement the spacing wheel is locked by the segment.

Referring again to Fig. 21, the end of the rod 118 being at 12 and there being no interruption in the motion of the shaft 64, downward movement will cause stud 123 to pass the point 7 at which time downward movement of the bobbin placing mechanism and the doffer head commences, and when the stud 123 reaches the point 15 further downward movement of the lever is arrested as the stud enters the straight radial slot which brings the lever to the position indicated by the dotted line 9—16. During movement of the stud 123 from a point 7 to 15 the end of the rod will have moved from 12 to 17 and is at the lowest position when in line with the point 18, the stud then being at the point 19. Movement of the rod from 18 to 20 carries the stud from 19 to 15 or to the commencement of the lower portion of the curved slot, and during the turning of the master shaft 64 from the point 20 to point 6 the stud is caused to move from point 15 to point 7.

While the slotted arm is locked at the lowest extremity of its movement the upper end of the rod is moving from point 17 to point 20, which is about one sixth of the revolution of the disk, the grasping members of the doffer head are released to close upon a full bobbin prior to removing the same from a spindle, and while this is being accomplished the doffer rod and the bobbin placing means are locked against any movement, and at this time the cam slot 130 in the back face of the gear 97 imparts movement by means of the roller that enters the slot to the link or bar 132 (Fig. 3ª), operating the lever connected therewith to move the bell crank 74 (Fig. 3) and raise the hollow plunger 136. At this time the doffer head is at its lowest point, and said plunger through the rod 137 presses upon the end of the bell crank upon the doffer head, retracts the wedge and allows the grasping fingers to close upon a bobbin, such action taking place when the end of the rod 118 is at the point 20. When the stud 123 is at 7, the doffer head is at its extreme upper movement, and the grasping members of the bobbin carrier or auxiliary doffer head are released to grasp a bobbin held by the main doffer head, the cam slot moving the link so that the lever will change the position of the bell crank 74, lowering the tube to engage a nut 139 on the rod attached to the bell crank of the doffer head to open the grasping members and release the bobbin.

It will be seen that a single turn or revolution of the master shaft, and mechanism connected therewith, gives an upward movement to the doffing mechanism, a long stop while the spacing wheel is moving, a downward movement to place the doffer head over the bobbin and a short stop at the end of the downward stroke so that the doffer head will be at rest when the jaws engage with a filled bobbin.

Having thus set forth our invention and shown a preferred form of doffing mechanism, we do not wish to be limited to the particular construction of details, as obviously numerous modifications can be made without departing from our invention, and though the doffer head is shown as being mounted upon a vertically movable rod, this feature may be modified when it is desired to dispense with an auxiliary bobbin carrier, and use the same doffer head and means for imparting thereto a vertical reciprocatory movement and a rotary movement to carry the bobbin out of line with the spindle, as shown in a co-pending application, and when a bobbin magazine mounted on the doffing frame is considered objectionable the bobbin supply mechanism may be mounted on the spinning frame, which magazine may be supported as shown in another co-pending application, bobbins being released therefrom by the lever attached to the guide tube, and when such construction is preferred the shaft for turning the bobbin magazine will be dispensed with, or said shaft may be employed with suitable gears to actuate bobbin carrying means in which the bobbins are dropped by the hereinbefore mentioned bobbin carrier.

Particular attention is directed to the fact that the doffer frame is suspended from the upper rail, the lower rail merely serving as a guide, and that the rail engaging wheels each have wide flanges on the front and narrow flanges at the rear which facilitate the removal of the doffer frame from the spinning frame. The axles of the upper wheels are mounted preferably on eccentric stub-shafts so that they may be moved relative to the doffer frame to allow the doffer frame to be lowered to place the teeth of the spacing wheel out of mesh with a rack bar carried by the spinning frame, and when out of mesh the doffer frame may be moved by hand along the spinning frame to position the same where desired thereon.

The recesses in the lower end of the guide tube admit of the doffer frame being moved along the spinning frame when lowered, and without such recesses the guide tube would engage the upper ends of the spindles. Without the provision of these recesses the guide tube would have to be shortened, which would be objectionable inasmuch as there would be an undue space between the lower ends of the guide tube and the upper ends of the spindle, and such space would be liable to cause the bobbins to catch upon the ends of the spindles, for it will be noted that the lower ends of the bobbins in the guide tube are of greater diameter than their upper portions. The construction shown is such that under no circumstances can the base of the bobbin engage the spindle.

The motor can be readily placed out of gear, and when the doffing mechanism is in operative position it may be moved along the spinning frame by hand, and when lowered it may be set without moving the frame along the spinning machine.

It will be particularly noted that the organization of the parts is such that where horizontal gears are used such gears are of small diameter, also that the larger gears are vertical or on transverse shafts, and by such arrangement we are enabled to provide a doffing machine which can be applied to spinning frames without unduly encroaching upon the aisle space between two spinning frames. The motor being upon the lower part of the doffer frame and below the guide rail is out of the way, and the flexible wires or cords for supplying current to the motor may be dragged along by the doffer frame between such frame and the spinning frame.

This invention is designed as an improvement upon the doffing machine shown and described by us in an application filed November 8, 1907, such application bearing Serial No. 401,308.

We claim—

1. The combination with a spinning machine having attached thereto a doffer-supporting rail and a guide rail, of a doffer frame having rail-engaging means attached thereto, and means for changing the position of a portion of said rail-engaging means with respect to the doffer frame to place another portion of said rail-engaging means in and out of engagement with the guide rail.

2. The combination with a spinning machine having attached thereto a longitudinal doffer supporting rail, a rack-bar and a guide rail, of a doffer frame having rail engaging means and an intermittently actuated gear for engagement with the rack-bar to move the doffer frame along the spinning frame and means on the doffer frame for lowering the same to place the gear out of engagement with the rack-bar.

3. The combination with a spinning frame having attached thereto supporting and guide rails for a doffer frame, of a doffer frame having supporting and guide wheels for engagement with the rails, and means for simultaneously changing the position of the supporting wheels with respect to the doffer frame to change the vertical relation of the doffer frame to the supporting rails.

4. The combination with a spinning frame having attached thereto a supporting rail, a guide rail, one of the rails having recesses formed therein, of a doffer frame having bobbin removing and bobbin placing means, a vertically disposed gear on the doffer frame which engages with the rail having recesses formed therein, and means for intermittently rotating the gear to effect a step by step movement of the doffer mechanism along the front of the spinning frame.

5. The combination with a spinning frame having guide rails and a rack-bar, of doffing mechanism comprising a bobbin removing and a bobbin placing means, a vertically disposed and intermittently rotated gear mounted to engage the rack-bar for effecting a step by step movement of the bobbin removing and bobbin placing mechanism in front of the spinning frame the movement being the same as the distance between the spindles, and a motor on the doffer frame for actuating the gear and the bobbin removing and bobbin placing mechanism.

6. The combination with a spinning frame having parallel supporting and guide rails attached thereto, a depending rack bar upon one of the rails, of a doffer frame having supporting and guide wheels for engagement with the rails, a vertically maintained gear for engagement with the rack bar and means for intermittently rotating the gear.

7. The combination with a spinning frame having parallel rails attached thereto, one of the rails being made up to provide a rackbar of a doffer frame having wheels for engagement with the rails, and a tooth gear mounted on a horizontal shaft for engagement with the rack bar, means for intermittently rotating the toothed gear and means for raising and lowering the doffer frame to effect engagement and disengagement of the tooth gear with the rack bar.

8. The combination with a spinning frame having a doffer-supporting rail and a rack bar attached thereto, of a doffer having wheels to engage said supporting-rail and having a vertically positioned gear that engages with said rack bar, and means for simultaneously varying the position of the journals of said wheels with respect to the doffer frame to raise and lower the doffer frame and move said gear into and out of mesh with said rack bar.

9. In doffing mechanism for spinning frames, the combination with a spinning frame having a rack-bar and supports for a doffer frame, of a doffer frame, means for maintaining the same in longitudinally movable engagement with the spinning frame, a gear that engages a rack-bar carried by the spinning frame, a continuously operating motor, and means between the motor and the gear for driving intermittently said gear and the doffing mechanism.

10. In doffing mechanism for spinning frames having ways attached thereto, a doffer frame, a motor attached to the doffer frame, a drive shaft from the motor, a master shaft in gear with the drive shaft, a spacing wheel, and means on the master shaft for imparting an intermittent rotary motion to said spacing wheel.

11. In combination with a spinning frame having horizontal rails attached thereto, of a doffer frame provided with means for engagement with the rails, means associated with the doffer frame for changing the position of one of the rail engaging means to lower the doffer frame so as to admit of the doffer frame being moved along the spinning frame without actuating the doffing mechanism carried by the doffer frame.

12. The combination with a spinning frame having mounted thereon a doffer-supporting rail and a rack bar, of a doffer provided with wheels for engagement with said rail, journals for said wheels vertically adjustable with relation to the doffer frame, and a vertically disposed gear for engagement with said rack bar.

13. In doffing mechanism for spinning frames having a rail for supporting the doffing mechanism, a doffer frame having rail engaging means and means for changing the vertical position of the doffer frame relative to the spinning frame, a guide tube carried by the doffer frame said guide tube having recesses through which the ends of the spindles may pass when the doffer frame is lowered.

14. The combination of a spinning frame having supporting means for a doffer frame, a rack-bar attached to the spinning frame, a doffer frame which is movable along the front of the spinning frame, means on the doffer frame for lowering the same, a gear carried by the doffer frame which is placed out of engagement with the rack-bar when the doffer frame is lowered, a guide tube for bobbins maintained in fixed position upon the doffer frame the lower end of the guide tube having open ended recesses which admit of the doffer frame being moved along the spinning frame when lowered without engaging the spindles of the spinning frame.

15. In doffing mechanism for spinning frames, a guide tube through which bobbins are supplied to the spindles of the spinning frame said guide tube having recesses formed in its lower end, one of the recesses being of a size to admit of the passage of the end of a spindle therethrough, and the other of a size to admit of the passage of a bobbin when on a spindle.

16. In a doffing mechanism for spinning frames, a guide tube for associating empty bobbins with the spindles of a spinning frame comprising a vertically maintained tube that is provided with opposite open-ended recesses in its lower portion one of which is of an area sufficient to admit of the passage therethrough of the upper end of the bobbin when on the spindle, means associated with the guide tube for retaining an empty bobbin therein, a vertical slot through the guide tube and means that enters the guide tube through said slot and is actuated to engage with a bobbin within the guide tube.

17. In doffing mechanism, a doffer head mounted upon a vertically movable support, means for reciprocating said support, and elastic means for arresting its movements near the ends of the reciprocation.

18. In doffing mechanism for spinning frames, means for removing filled bobbins successively from the spindles of a spinning frame comprising a vertically reciprocatory instrumentality which is actuated when in vertical alinement with a spindle of a spinning frame, means for grasping a bobbin while in engagement with the bobbin removing means to take a bobbin therefrom after its removal from a spindle and means for moving said bobbin grasping means to carry a bobbin out of alinement with the means for removing a bobbin from a spindle.

19. In doffing mechanism for spinning frames, means for removing bobbins from spindles, and means for taking a bobbin therefrom and carrying the same forward of the spindle from which the bobbin was taken.

20. In bobbin placing and doffing mechanism for spinning machines, a doffer head for removing a filled bobbin from a spindle, means for taking a filled bobbin from the doffer head and carrying the same forward and other means for releasing the bobbin from its carrier.

21. The combination in bobbin removing mechanism for spinning machines, of a carriage for bobbin removing means, a bobbin engaging and removing means mounted upon the carriage, means for vertically reciprocating the same to engage and lift a bobbin from a spindle and horizontally reciprocating means having bobbin grasping members to engage a bobbin when removed from a spindle and to hold the same when released from the bobbin removing means and to carry the bobbin forward of the bobbin removing means.

22. A doffer mechanism for spinning frames comprising an intermittently movable carriage, bobbin removing means on said carriage, and a traveling bobbin carrier to which the bobbin is delivered by the bobbin removing means.

23. A doffer head comprising an apertured base and a plurality of superimposed bobbin grasping members maintained above the base, the grasping members being constructed and maintained by the base so that they will overlap when closed upon a bobbin.

24. A doffer head having on opposite sides a plurality of superimposed and independently movable bobbin engaging members, those on one side of the doffer head being maintained out of horizontal alinement with the bobbin engaging members on the opposite side.

25. A doffer head having bobbin engaging members and upwardly projecting parts carried thereby, and independent means for moving each pair of bobbin engaging members one toward the other.

26. In doffing mechanism for spinning frames, a doffer head or bobbin removing instrumentality comprising a structure provided on opposite sides with a plurality of superposed and independently movable bobbin engaging members, means for moving the members inward one independent of the other to engage a bobbin, and reciprocatory means for engagement with each of the bobbin engaging members to effect movement of the same simultaneously against the movement imparted to said members by the means for moving said members inward.

27. A doffer head comprising a base, a plurality of superimposed bobbin-grasping members associated with the base, each member having divaricating fingers which overlie the fingers of the bobbin-grasping members on the opposite side of the doffer head, said bobbin-grasping members also having intermediate vertically-extending portions located at the point of divarication of the fingers, said portions lying opposite to the point of divarication of the fingers on the opposite bobbin-grasping members and in substantially the same horizontal plane as said opposite fingers.

28. A doffer head having several superimposed and overlapping bobbin grasping members maintained so the range of movement of said members will be such that they may engage either an empty or a filled bobbin, means for moving each pair of the bobbin engaging members toward each other, and means for simultaneously separating the grasping members.

29. A doffer head having on opposite sides of its longitudinal center superimposed bobbin engaging members the ends of the members on one side extending to overlie the ends of opposite bobbin engaging members.

30. In doffing mechanism, a vertical standard, an intermittently driven shaft terminating within said standard, and a bobbin carrying magazine provided with means for engagement with the driven shaft.

31. In doffing mechanism, a standard, a drive shaft terminating within said standard, a bobbin magazine, and a depending member which is adapted to enter the standard and engage therein with the drive shaft.

32. In doffing mechanism, a rotatable magazine having vertically and radially disposed bobbin compartments constructed to maintain bobbins in an inclined position one above the other, and oscillatory means for retaining bobbins in the compartments and for releasing them one at a time therefrom.

33. In doffer mechanism for spinning frames, a bobbin carrying magazine having a plurality of bobbin carrying compartments each compartment having walls which converge to maintain a series of bobbins in an inclined position one above the other and means carried by the magazine that engages the larger end of the lower bobbin of the series to hold the bobbins in the compartment.

34. In doffing mechanism, a bobbin magazine having a plurality of converging bobbin compartments in which the bobbins are maintained at an inclination with their large ends downward, and catches having inward extending portions adapted to engage with the heads of adjacent bobbins for effecting delivery of a single bobbin at a time from the compartments.

35. In doffing mechanism for spinning frames, a rotary bobbin magazine having a series of centrally converging bobbin compartments in which a plurality of bobbins are carried in an inclined position with their large ends downward and outward and means attached to the magazine for retaining the bobbins in the compartments and for releasing a bobbin therefrom.

36. In doffing mechanism, a revoluble bobbin magazine having a circumferential series of inwardly converging bobbin chambers, the outer portion of the chambers being adapted to receive the larger ends of the bobbins and the inner portion the smaller ends.

37. In doffing mechanism, a bobbin magazine having bobbin chambers in which a plurality of bobbins are maintained in an inclined position, oscillatory catches each having inwardly extending portions, a spring for moving the lower portion inward, and means on the doffer frame for moving the catches against the action of their springs, for the purpose of releasing a single bobbin when a catch is actuated.

38. In doffing mechanism for spinning frames, a doffer frame, means for moving the doffer frame along the spinning frame, a clutch associated with a drive shaft of the moving means, bobbin removing means, means movable above the plane of the upper ends of the spindles and adapted to engage with a bobbin upon a spindle, and means actuated by the restriction of the movement of the means that operates above the plane of the spindles to disconnect the clutch from the drive shaft of the doffing mechanism.

39. In doffing mechanism for spinning frames, a driven shaft having a clutch thereon, a bobbin removing means, means associated therewith and having a range of movement over a bare spindle, means associated with the last mentioned means which is adapted to disconnect the clutch from the drive shaft when its movement is restricted by engagement with a bobbin upon a spindle.

40. A doffing machine having a stop mechanism for throwing the machine out of operation, and means having a movement above the upper ends of the bare spindles of the spinning frame, said means being connected with said stop mechanism, whereby to operate the latter when movement of said means is restricted by engagement with a bobbin on a spindle.

41. A doffer for spinning frames comprising means for advancing the doffer along the spinning frame, driving means, a device having a movement above the upper end of the bare spindles on the spinning frame, and means operable when said device is stopped by engagement with a bobbin on a spindle for disconnecting said driving means from said advancing means.

42. A doffing machine for spinning frames comprising an element which is movable past a bare spindle and which is arranged to be stopped by a bobbin when on such spindle, and means operable when said element is so stopped for terminating the operation of the doffing machine.

43. In a doffing machine, in combination, doffing mechanism, actuating means therefor, a clutch interposed between said doffing mechanism and said actuating means, a thread cutter, and means associated with said thread cutter to separate the clutch and render the doffing mechanism idle when movement of the thread cutter is restricted by engagement with a bobbin positioned in the range of movement of the thread cutter.

44. In a doffer for spinning frames, in combination, doffing mechanism; means for advancing the doffer along the spinning frame; means for actuating the doffing mechanism during such movement along the spinning frame; driving means; a clutch connecting said driving means with said advancing means and said actuating means; and means for operating the clutch to disconnect said driving means from said advancing means and said actuating means, said clutch-operating means being operative in case of a failure of the doffing mechanism to remove a full bobbin from a spindle of the spinning frame.

45. In doffing mechanism, a drive shaft, a clutch thereon, a master shaft that is actuated from the drive shaft, an arm connected with the clutch, a detent on the master shaft, a pawl attached to the arm for engagement with the detent, a lever one end of which is maintained to be engaged by a part on the master shaft, a reciprocating slide connected to the other end of the lever, means on the lever for actuating the pawl, the parts being organized to effect disengagement of the clutch when movement of the slide is restrained.

46. In doffing mechanism, the combination with a thread cutter and stop mechanism which includes a clutch between a drive and a driven shaft, a movable standard which carries the thread cutter, a lever, means for connecting the standard to the lever, a spring for moving the lever in one direction, means for moving the lever against the action of the spring, and means operatively connected with the lever to effect a disengagement of the clutch when movement of the thread cutter is restrained between the limits of its reciprocations.

47. In a doffing machine, a doffer head having on opposite sides thereof members maintained to be movable toward and from each other, said members having in different planes diverging bobbin-engaging portions, the portions on opposite sides of the doffer head being in different planes and overlapping each other.

48. In doffing mechanism for spinning frames, a bobbin removing means provided on each side of its longitudinal center with a plurality of independently movable arms each arm having bobbin grasping portions which project on different horizontal planes to circumferentially engage the bobbin in different transverse planes.

49. In doffing mechanism, a device for removing a bobbin from a spindle comprising a support provided on opposite sides with a plurality of pairs of superposed pivoted arms, bobbin grasping members formed on each of the arms and consisting of fingers which diverge in a plane parallel with the pivoted movement of the arms, and means for moving the arms on the support so that the bobbin grasping members on opposite sides of the support may encircle a bobbin.

50. In a doffing machine for spinning frames, a doffer head having on opposite sides thereof movable arms arranged one above the other, said arms having thereon diverging bobbin-grasping portions, said portions on each arm extending in the same horizontal plane and being of such a length that the grasping members on opposite sides of the doffer head will encircle a bobbin, spring-actuated means for moving opposite arms simultaneously toward each other, and a reciprocatory wedge adapted to simultaneously engage all of said arms to effect disengagement of the bobbin-grasping portions from a bobbin.

51. In doffing mechanism for spinning frames, a doffer head provided with pivoted arms having thereon bobbin engaging members that diverge and extend horizontally in the same plane from the pivoted arms, spring actuated means on the doffer head for moving the bobbin encircling and engaging members of the doffer head against a bobbin, reciprocatory means for simultaneously moving the bobbing engaging members against the action of the spring actuated means to release a bobbin and a vertically reciprocatory support for the doffer head that moves the same vertically when in line with the longitudinal axis of a spindle.

52. In doffer mechanism for spinning frames, a vertically movable doffer head having on each side several movable arms each arm having on the same horizontal plane diverging bobbin engaging members, means engaging the arms to move the same toward each other, means for moving simultaneously the arms and attached bobbin engaging members to release a bobbin therefrom and a vertically reciprocatory support for the doffer head which is operatively connected with doffer mechanism prior to the change of direction of movement of the doffer head and means for actuating the separating means for the arms and the bobbin engaging members during the period of stoppage of the doffer head.

53. In doffer mechanism for spinning frames, a doffer head for removing filled bobbins successively from the spindles thereof comprising a plurality of bobbin-engaging members which are maintained for independent movement on different horizontal planes and in vertical series to encircle a filled bobbin on different circumferential planes.

54. In an attachment for spinning machines having a rack bar and rails for the support of a doffer frame, a doffer frame having vertically disposed wheels for engagement with the rails, means for doffing and means for placing bobbins on the spindles of the spinning machine, a vertically disposed gear wheel maintained by the doffer frame to engage the rack bar on the spinning frame, means for intermittently rotating and means for intermittently locking the gear wheel, such mechanism being organized so that the doffer frame will be held against movement when the doffing and bobbin placing instrumentalities are in vertical alinement with the spindle.

55. In an attachment for spinning machines, a rack bar and rails attached thereto, a doffer frame having operatively connected therewith means for attaching the same to the rails of the spinning machines, means for doffing and means for placing bobbins on spindles, a gear wheel that engages with the rack bar for moving the doffer frame, and means organized to hold the gear wheel against rotation when the doffing and bobbin placing instrumentalities are brought in vertical alinement with the spindles.

56. In doffer mechanism for spinning frames, a rack bar attached to the spinning frame, a doffer frame provided with doffing mechanism and with a vertically maintained gear wheel which is adapted to engage the rack bar on the spinning frame, and means for intermittently moving and means for intermittently locking the gear wheel.

57. A doffer mechanism for spinning frames comprising a doffer frame, means on the doffer frame for removing full bobbins from the spindles of the spinning frame, means on the doffer frame for supplying empty bobbins to the empty spindles, a depending rack bar attached to the spinning frame, and a vertically disposed and intermittently driven and locked gear on the doffer frame that engages the rack-bar which is attached to the spinning frame.

58. In a bobbin doffing attachment for spinning machines, a rack bar attached thereto, a doffer frame having an intermittent gear that engages the rack-bar, the interdents of the rack bar and the teeth of the gear being placed relative to the distance between adjacent spindles of the spinning machine, and means for imparting a partial rotation to the gear wheel to move the doffer frame along the spinning frame a distance equal to the distance between adjacent spindles.

59. The combination with a spinning machine and its spindles, of a movable doffer frame, a horizontally swinging arm which extends rearward from the doffer frame to engage the whirl of a spindle when the doffer frame is at rest, said arm being maintained to be moved out of engagement with the whirl of the spindle as the doffer frame is moved along the spinning machine.

60. In doffing mechanism a doffer frame having a pivoted spindle engaging arm and means that engage the arm and the doffer frame to move the arm in the path of the whirls on the spindles.

61. In doffing mechanism, a horizontally movable doffer frame provided with a pivoted spindle engaging arm, and means for moving the arm so that it will be positioned in the path of the spindles on a spinning frame.

62. In doffer mechanism for spinning frames having a support for a doffer frame and a rack-bar, a doffer frame, a vertically reciprocatory filled bobbin removing means, a bobbin supply tube, a bobbin seating device, an intermittently actuated gear wheel for engagement with a rack bar on the spinning frame, and intermittently acting means for turning the gear wheel to intermittently move the doffer frame along the spinning frame, and means to intermittently lock the doffer frame to the spinning frame.

63. In doffing mechanism for spinning frames having rails with which a doffer frame engages and a rack-bar, a doffer frame having thereon a motor and a master shaft which is driven from the motor on the doffer frame, a gear which engages the rack-bar and is intermittently rotated by the mastershaft to move the doffer frame along the spinning frame, a bobbin supply mechanism actuated by the intermittent motion of the gear, and mechanism between the master shaft and a doffer head for reciprocating the doffer head and for holding the same against movement at the end of each reciprocation.

64. In doffing mechanism a constantly driven master shaft, a rock arm connected therewith, a slotted guide plate which is fixedly attached to the frame of the doffer mechanism, a slotted arm connected to the rock arm, a stud on the connecting means that intersects the slots through the guide plate and said slotted arm, the parts being organized to impart an intermittent oscillatory movement to the slotted arm, and a vertically movable doffer head which is operatively connected with the slotted arm.

65. In doffing mechanism, a doffer head, an oscillatory arm having therethrough a longitudinal slot, means for connecting the arm with the doffer head, a fixed guide plate which has therethrough a slot the ends thereof being in line with the range of movement of the slot through the oscillatory arm, uninterrupted moving means for actuating the arm a part of such means intersecting the slots through the guide plate and the arm.

66. In doffing mechanism, a slotted arm fulcrumed upon a support and operatively connected to doffing mechanism, a guide having therethrough a slot with intermediate segmental walls and parallel terminal walls, means for engaging intersecting portions of the slots to oscillate the slotted arm during movement in the segmental portion of the slot, and to lock the same against movement when the slots are in alinement.

67. In doffing mechanism a guide plate having therethrough a slot shaped to provide radial end portions and an intermediate curved portion, an oscillatory arm having a slot therethrough, means guided by one of the slots to intermittently raise and lower the arm to actuate doffing mechanism.

68. In doffing mechanism, a fixture having a guide slot therethrough, a slotted arm pivotally supported relative to the guide slot, actuating means that engage the walls of the slot to oscillate the arm and to lock the same at the limit of its oscillations, and doffing mechanism operatively connected to the arm.

69. In doffing mechanism a rod actuated to impart an uninterrupted oscillation to a rock bar, a fixed guide plate having a slot therethrough, a pivotally supported arm provided with an intermediate slot, a stud which intersects the slot and is connected to the rock bar, the parts being organized so that the uninterrupted oscillations of the rock bar will impart interrupted oscillations to the slotted arm, and means for transmitting such motion to a doffer head.

70. In doffing mechanism for spinning frames, a doffer frame, a rigid fixture attached to the doffer frame and provided with a guideway, an arm pivoted to the fixture, means guided by the fixture for moving the arm and for holding the arm against movement when the arm and guideway are in alinement, and a bar connected to the arm to be reciprocated therefrom and bobbin removing means carried by the reciprocatory bar.

71. In doffing mechanism, a fixture having therethrough a slot, the intermediate portion of which is segmental, and radial end portions, one of the end portions being of greater length than the other, a longitudinal slotted arm pivoted at one end of the fixture and connected to doffing mechanism at the other end, reciprocating means guided by the walls of the slots to impart motion to the arm, and means for transmitting such motion to a doffer rod whereby said rod will be given a reciprocating motion having a stoppage at the limit of its upward movement, and a shorter stoppage at the limit of its downward movement.

72. In doffing mechanism for spinning frames, a doffer frame, a spacing wheel that is intermittently driven to engage a part on the spinning frame to move the doffer frame along the spinning frame, a bobbin magazine and means movable with the spacing wheel to intermittently rotate the bobbin magazine.

73. In doffing mechanism for spinning frames, a doffer frame, a spacing wheel for intermittently moving the doffer frame along the spinning frame, a bobbin carrying magazine and gearing organized to rotate the bobbin magazine in unison with the spacing wheel.

74. In doffing mechanism for spinning frames, a drive shaft, a master shaft in gear with the drive shaft, a spacing wheel that engages with the spinning frame and is intermittently rotated by the master shaft, means actuated during movement of the spacing wheel to intermittently supply bobbins to the doffer mechanism, a doffer rod, a bobbin engaging presser plate, means between the doffer rod and the master shaft for imparting a vertical reciprocatory motion to the doffer rod and to the bobbin engaging presser plate, a lever oscillated by the master shaft and operatively connected with means for opening the grasping members of a doffer head on the doffer rod, a vertically maintained rock shaft that places the presser plate in and out of operative position, a lever that engages on one end an interrupted flange upon the master shaft, a thread cutter means operatively connected with said lever for actuating the thread cutter and means for disconnecting the drive shaft from its driving means to effect a stoppage of the doffing mechanism in case of failure to remove a bobbin from a spindle.

75. A doffer for spinning frames, a supporting rail, a rack-bar and a guide rail attached to the spinning frame, in combination with a movable doffer frame having wheels for engagement with the rails and a spacing wheel for engagement with the rack-bar, a motor mounted upon the doffer frame, means actuated by the motor which imparts an intermittent motion to the spacing wheel, a clutch constituting a part of the motion transmitting mechanism and means controlled by a part of the doffing mechanism for operating the clutch to render the drive shaft idle.

76. A doffer mechanism for spinning frames, comprising a doffer frame, means on the doffer frame for removing filled bobbins from spindles, means carried by the doffer frame for supplying empty bobbins to empty spindles, a depending rack bar attached to the spinning frame, a tooth gear wheel carried by the doffer frame to engage the depending teeth of the rack bar, means for actuating the gear wheel to move the doffer frame along the spinning frame intermittently, and means for locking the gear so as to lock the doffer frame against movement upon the spinning frame.

77. The combination with a spinning frame of a movable doffer having a thread cutter mounted thereon, means for maintaining said thread cutter in the same horizontal plane as the upper end of a bobbin when on a spindle of the spinning frame and above the upper end of a bare spindle; whereby the thread cutter during the movement of the doffer will engage with a bobbin on the spindle; and means actuated by the engagement of the thread cutter with the bobbin for arresting movement of the doffer.

78. In doffing mechanism for spinning frames, a reciprocating member a part of which is maintained in line with the upper portion of a bobbin when on a spindle, a lever connected to such member, a spring for moving the lever in one direction, a disk having a flange upon which one end of the lever may ride the flange being of such dimensions as to provide a space between its ends across which the lever is moved by the spring, a drive shaft, a clutch on the drive shaft, a bell crank connected with a movable member of the clutch, a pawl attached to the bell crank, a detent on the disk, connecting means between the lever and pawl, the parts being organized so that restricted oscillation of the lever will result in positioning the pawl so that it will be engaged by the detent and raised to disconnect the clutch, unrestricted movement of the lever resulting in placing the pawl out of the path of the detent.

79. The combination with a spinning machine having a rack-bar attached thereto of doffing mechanism, comprising a master shaft provided with a drive gear, means for imparting a continuous rotary motion thereto, a cam slot in one of the faces of the drive gear, a disk having a peripherally located detent, a segmental flange on one side of the disk, a segment and a pin on the other face of the disk, a spacing wheel that engages the rack-bar and is intermittently moved by the pin and intermittently locked by the segment, and means for actuating the parts of the doffing mechanism controlled by the aforesaid master shaft.

80. An automatic bobbin doffer for spinning machines including the doffer frame, means carried by the doffer frame to automatically feed bobbins to the spinning machine, an intermittently actuated gear that automatically and intermittently moves the doffer along said spinning machine and holds the doffer against movement after the completion of each of its movements along the spinning frame, and means for actuating the gear.

81. A doffer mechanism for spinning frames comprising an intermittently movable carriage, an intermittently actuated doffing mechanism, an intermittently rotated gear for moving the carriage along the spinning frame and for locking the carriage to the spinning frame and means for actuating the gear.

82. A doffer mechanism for spinning frames comprising an intermittently movable carriage, bobbin removing means on said carriage, an intermittently actuated gear that both moves the carriage along the spinning frame and locks the carriage to the spinning frame and means for actuating the gear.

83. In doffing mechanism for spinning frames, a magazine for empty bobbins comprising a series of bobbin receiving chambers which are open at the top and bottom to receive and maintain empty bobbins in an inclined position, means for engagement with one end of a bobbin to retain that bobbin and those above within the chamber and means in coöperative relation with the first mentioned means to engage and maintain the bobbin next above the lower one when the lower bobbin is released.

84. A magazine for empty bobbins consisting of a plurality of vertical bobbin receiving chambers which are open at both the upper and the lower ends and are provided with vertical end walls that are spaced one from the other to receive bobbins so that they will engage said end walls and be maintained one above the other in an inclined position and means associated with each chamber for engagement with the lowest bobbin therein.

85. A bobbin-grasping means for doffers comprising a pair of arms movable toward and away from each other, said arms having staggered fingers thereon, the fingers of one arm overlying those of the other arm.

86. A bobbin-grasping device for doffers comprising two devices movable toward and away from each other to engage a bobbin from opposite sides, the devices having fingers arranged alternately and intermeshing with each other.

87. A bobbin-grasping device for removing a bobbin from a spindle comprising a support, and a plurality of pairs of arms individually pivoted on said support one pair above the other and adapted to straddle a bobbin, said arms being arranged for independent pivotal movement with relation to each other in a horizontal plane to engage a bobbin, and spring means tending to move the arms of each pair toward each other.

88. In bobbin-placing mechanism a bobbin magazine having oppositely disposed vertical walls or guides for opposite ends of the bobbins, said walls being spaced apart uniformly from top to bottom a distance less than the length of a bobbin whereby the bobbins will be held in a slanting position, and stop means movably mounted on the lower end of the magazine and engaging the lower end of the lowermost bobbin for supporting the tier of bobbins, said tier descending vertically in the magazine when said stop means is operated.

In testimony whereof we affix our signatures in presence of two witnesses.

ARTHUR GEO. BOOZER, JR.
GEO. HILL.

Witnesses:
W. R. TANNER,
CARL M. MILLER.